United States Patent
li et al.

(10) Patent No.: US 7,143,392 B2
(45) Date of Patent: Nov. 28, 2006

(54) HYPERBOLIC TREE SPACE DISPLAY OF COMPUTER SYSTEM MONITORING AND ANALYSIS DATA

(75) Inventors: Jun li, Menlo Park, CA (US); Keith E. Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 10/073,850

(22) Filed: Feb. 11, 2002

(65) Prior Publication Data

US 2003/0056199 A1    Mar. 20, 2003

Related U.S. Application Data

(63) Continuation-in-part of application No. 09/955,764, filed on Sep. 19, 2001.

(51) Int. Cl.
G06F 9/44 (2006.01)
G06F 3/00 (2006.01)

(52) U.S. Cl. ............... 717/125; 717/105; 717/127; 715/767; 715/771; 715/854

(58) Field of Classification Search ............... 717/105, 717/125, 127; 715/764, 771, 853, 854, 767
See application file for complete search history.

(56) References Cited

U.S. PATENT DOCUMENTS

| | | | |
|---|---|---|---|
| 5,590,250 A * | 12/1996 | Lamping et al. | 345/427 |
| 5,619,632 A * | 4/1997 | Lamping et al. | 345/441 |
| 6,026,362 A | 2/2000 | Kim et al. | 705/1 |
| 6,104,400 A | 8/2000 | Halachmi et al. | 345/356 |
| 6,178,382 B1 * | 1/2001 | Roederer et al. | 702/21 |
| 6,256,648 B1 | 7/2001 | Hill et al. | 707/501 |
| 6,266,805 B1 * | 7/2001 | Nwana et al. | 717/104 |
| 6,377,287 B1 * | 4/2002 | Hao et al. | 715/853 |
| 6,499,026 B1 * | 12/2002 | Rivette et al. | 707/2 |
| 6,604,114 B1 * | 8/2003 | Toong et al. | 707/104.1 |
| 6,775,659 B1 * | 8/2004 | Clifton-Bligh | 707/1 |
| 6,897,885 B1 * | 5/2005 | Hao et al. | 715/853 |
| 2002/0171687 A1 * | 11/2002 | Li et al. | 345/853 |

OTHER PUBLICATIONS

John Lamping, Ramana Rao, and Peter Pirolli, "A Focus+Context Technique Based on Hyperbolic Geometry for Visualizing Large Hierarchies", May 1995, Proc. of the SIGCHI conference on Human factors in computing systems, ISBN:0-201-84705-1, pp. 401-408.*
M. Cameron, M. Garcia de la Banda, K. Marriott, P. Moulder, "ViMer: a visual debugger for mercury ", Aug. 2003 , Proc. of the 5th ACM SIGPLAN international conf. on Principles and practice of declaritive programming, ISBN:1-58113-705-2, pp. 56-66.*
Peter Bates, "Debugging heterogeneous distributed systems using event-based models of behavior ", 1989, ACM SIGPLAN Notices, vol. 24 Issue 1, ISSN:0362-1340, pp. 11-22.*

(Continued)

*Primary Examiner*—Tuan Dam
*Assistant Examiner*—J. Derek Rutten

(57) ABSTRACT

A method for displaying a computer system runtime information includes the steps of displaying a plurality of runtime information items in different hyperbolic trees. The method further comprises the steps of navigating and inspecting runtime information within each individual hyperbolic tree, and navigating between semantically linked hyperbolic trees.

21 Claims, 17 Drawing Sheets

OTHER PUBLICATIONS

Mohlalefi Sefika, Aamod Sane, Roy H. Campbell, "Architecture-oriented visualization", 1996, Proceedings of the 11th ACM SIGPLAN conference on Object-oriented programming, systems, languages, and applications, ISSN:0362-1340 , pp. 389-405.*

Yannis E. Ioannidis, "Dynamic information visualization", Dec. 1996, ACM SIGMOD Record, vol. 25 Issue 4, ISSN:0163-5808, pp. 16-20.*

Vladimir Bulatov, "Java Hyperbolic Browser in action!", webpage archived on Jun. 10, 1997 at <http://web.archive.org/web/19970610021228/http://www.physics.orst.edu/~bulatov/HyperProf/applet.html>.*

Vladimir Bulatov, "The HyperProf—hyperbolic profile browser for Java", webpage archived on Jun. 10, 1997 at <http://web.archive.org/web/19970610022025/http://www.physics.orst.edu/~bulatov/HyperProf/README>.*

Ming Hao et al. "Visual Mining Large Web-based Hyperbolic Space Using Hidden Links", Jan. 1999, Software Technology Laboratory, HP Laboratories Palo Alto, HPL-1999-20, pp. 1-8.*

Ming Hao et al. "Java-based Visual Mining Infrastructure and Applications", 1999, IEEE, Information Visualization 1999 Proceedings, (Info Vis '99), pp. 124-126.*

"Inxight Hyperbolic Tree Server", Inxight Software, archived Dec. 12, 2000, Accessed and printed online on Jan. 6, 2006 at <http://web.archive.org/web/20001212082800/www.inxight.com/products_wb/ht_server/index.html>.*

Munzner, T., "H3: laying out large directed graphs in 3D hyperbolic space", Oct. 20-21, 1997 , Information Visualization, 1997. Proceedings., IEEE Symposium on, pp. 2-10, 114.*

Graham, S.L., et al., "An Execution Profiler for Modular Programs," 1983, Software—Practice and Experience, 13:671-685.

Kazi, I.H., et al., "JaViz: A client/server Java profiling tool," 2000, IBM Systems Journal, 39(1):96-117.

Liao, S., et al., "SUIF Explorer: An Interactive and Interprocedural Parallelizer," 7th ACM SIGPLAN Symposium on Principles & Practice of Parallel Programming, Atlanta, GA, May 4-6, 1999, pp. 37-48 (12 pages).

"HyperProf( v.1.3)—Java profile browser," 1997; available on website http://www.physics.orst.edu/ bulatov/HyperProf/ (total of 1 page).

"Visualizing the Structure of the World Wide Web in 3D Hyperbolic Space," date unknown; available on website http://graphics/stanford.edu/papers/webviz/htmlnosplit/ (total of 11 pages).

* cited by examiner

HYPERBOLIC TREE SPACE DISPLAY OF COMPUTER SYSTEM MONITORING AND ANALYSIS DATA

This application is a continuation-in-part of U.S. patent application Ser. No. 09/955,764, filed Sep. 19, 2001.

FIELD OF THE INVENTION

The present invention relates generally to runtime monitoring in a distributed computer system, and more particularly to runtime monitoring in a component-based distributed system.

BACKGROUND OF THE INVENTION

A key part of software code development is the use of debuggers and profiling tools to understand what a software system is doing. Typically, debuggers (such as Microsoft Visual Studio from Microsoft Corporation or gdb from the Free Software Foundation) are used to diagnose a logic flaw in a program that caused the program to reach an erroneous result. Causal tracing and call stacks, for example, are an essential part of the value derived from program debuggers. Profiling tools (such as gprof (a common Unix tool), Purify (from Rational Corporation), and Quantify (also from Rational Corporation)) are used to capture details about how the program completes its task (for example, how much memory was used, where was most of the time spent in the program, or how system/network resources were used). Statistical analyses of program timing behavior and resource utilization are critical elements of program profiling tools. Thus debugging tools are generally used for checking functional correctness and causal diagnostics while profiling tools are used for checking performance metrics.

Until recently, most programs were written in a programming model known as single-threaded single-process execution (meaning that only one thread of execution ran within an application and the application ran on a single processor). In the mid-1980s, a new class of programs emerged that was known as distributed systems. These systems were notoriously difficult to debug and understand, as they tended to have multiple threads of control and run across multiple processors/computers. The existing debuggers and profilers were not suited to this distributed, multi-threaded programming model.

With the advent of the new class of programs in the 1980s, new tools began to emerge in the area of distributed debuggers and distributed system profilers. These tools can be classified as: application-level-logging tools, binary-rewriting tools, debugger-per-thread tools, network/OS-message-logging tools, and instrumented virtual-machine tools.

Application-level-logging tools were essentially the use of macros embedded in application code that produced printf( ) logs. The principal disadvantage of these tools was that the source code had to be written with logging in mind (i.e., the developer had to consciously add a log at an important event). A variant on the application-level-logging techniques is binary re-writing techniques. Quantify (from Rational Corporation) is a version of a binary-rewriting tool. It rewrites the application code by inserting counting instructions at the basic blocks of the binary program (a basic block is a unit of non-branching code). Quantify does not work on multi-process applications and cannot find causal linkage across processes/threads. The Paradyn tool (from University of Wisconsin—Madison) is a binary rewriting system but has the disadvantage of not being able to automatically filter log messages or track causality between processes (or threads) in the distributed system. The AIMS (Automated Instrumentation and Monitoring System from NASA Ames Research Center) is a source re-writing system that inserts log entry points; however, AIMS also fails to correlate events across threads or to provide causal linkage between processes (i.e., why an event occurred).

Debugger-per-thread tools provide a debugging window per process in the distributed system. There are two key disadvantages to these tools: the first is the screen real-estate taken up in any large scale system, the second is the inability to correlate between processes (i.e., it is not possible to tell what caused one process to enter a particular state or who sent the message).

Network/OS-message-logging tools monitor network traffic by intercepting network packets (and operating system events). Examples of such tools are Sun Microsystem's THREADMON and Hewlett-Packard's DESKTOP MANAGEMENT INTERFACE. These tools are particularly useful for identifying bandwidth issues or amount of CPU consumed by a process. However, these tools have great difficulty turning the network packet (or operating system call) into application meaningful events (i.e., usually one just gets a packet of bytes and no easy way to interpret why the packet of bytes was sent or what the packet is trying to cause to happen).

Finally, in the instrumented virtual machine approach, there are systems like JAVAVIZ (also referred to as JAVIZ, available from the University of Minnesota) for monitoring applications that span multiple Java virtual machines. The principal disadvantage of this approach is that it is tied to the Java Virtual Machine and does not allow intermixing multiple languages or platforms.

For all the above approaches the principal disadvantages are the inability to track causal chains across threads and processes, the intrusiveness of the approach (i.e., requiring changes to the source code), and the inability to track resource utilization (e.g., CPU, memory, bandwidth, time) to application meaningful events.

No existing program development environments are sufficient to debug, monitor, and characterize a multi-threaded, multi-processed, and distributed system.

The display of software runtime information is valuable for many reasons, including being used for diagnosing problems and understanding and analyzing and optimizing runtime behavior. In addition, the collection and display of runtime information may provide aid in designing and developing new software components and in evolving existing software components.

The display of runtime information according to the prior art typically includes displaying timing latency information, i.e., displaying how long it takes for a function invocation to execute. In addition, the prior art approach may display simple resource usage, such as overall process execution times and overall memory consumption.

The runtime information may be displayed on some manner of computer display, and may be used to monitor execution of an associated computer system or may be used to analyze the execution of a process. In addition, the information may be used to help understand the interaction between different subsystems within the system. Moreover, the information may be used in order to determine how to schedule shared resources (such as scheduling CPU resources onto different processors), and therefore may be used to effectively eliminate performance bottleneck. Furthermore, the information may be used for software quality assurance, and may even be used to provide clues and focus for monitoring of future runs of the system.

In the prior art, visualization of runtime information is typically done using a flat two-dimensional display that is capable of showing very limited types of system runtime information and therefore is capable of showing only a small portion of gathered runtime information. If multiple types of system information are available, they are usually shown in an isolated fashion, i.e., the display does not show the inter-relationships between different system information. The prior art runtime monitoring typically displays execution times or timing latencies, and sometimes may display a static call graph with details of each local procedure call. Although two dimensional hyperbolic tree displays and three dimensional hyperbolic sphere displays have been explored as ways to visualize certain system information, they are confined to only one particular type of system information, such as a static call graph or a source code package. Moreover, function invocation and thread spawning are considered to be independent activities in the prior art runtime information display, even though in reality they are causally linked to form a complete dynamic system.

The runtime information display of the prior art suffers from several drawbacks. The prior art is not capable of presenting a dynamic call graph (showing system-wide function invocations and thread spawning) and instead shows only a static call graph or a dynamic call graph that is only concerned with function invocations. The prior art uses a flat, two-dimensional display (i.e., a planar graph) that shows only a small portion of information. Consequently, the viewer cannot accurately and completely comprehend the available information and may not be able to easily move between the various items of information. Moreover, the viewer cannot obtain an accurate picture of how the different pieces of information are inter-linked and inter-related. The viewer may have to exit one graph or display in order to access another graph or display, resulting in delay, distraction, etc., for the user.

An additional drawback of the prior art approaches is that they do not scale well to large amounts of runtime information. For example, the runtime information may contain in excess of tens of thousands of function invocations, and each function invocation may generate a collection of data items.

Another drawback is that there is no ability to correlate a call graph data with other analysis results. The prior art is unable to comprehensively characterize and display a complete runtime system behavior of a computer system. The prior art is especially unable to comprehensively characterize and display a complete runtime system behavior of a software component-based computer system.

Therefore, there remains a need in the art for improvements in runtime monitoring and characterization for a computer system.

SUMMARY OF THE INVENTION

The method employs instrumented stubs and skeletons that are based on an IDL interface of instrumented software applications. The method therefore gathers data at a start of the stub, at an end of the stub, at the start of the skeleton, and at the end of the skeleton. The method also gathers data regarding memory allocation/deallocation and regarding thread creation and destruction. The monitoring method according to the invention is therefore able to create a Global Causal Identifier for a collection of threads that semantically span one or more caller/callee boundaries. This may include the incrementing of a local event number that allows tracking of thread relationships, and further allows an ordering of gathered data in order to track the relationships. Moreover, parent and child relationships are captured for threads by pairing the associated local thread identifiers. The Global Causal Identifier, the Event Numbers, the parent and child thread identifier pairs, and the instrumented stub and skeleton probes are used by the invention to calculate a system-wide causal chain and to compute an end-to-end latency, a CPU utilization, and a total memory usage for a software component executing within a component-based software system.

A monitoring method for a component-based software system operating over one or more processing devices is provided according to one embodiment of the invention. The method comprises the steps of initiating an invocation of a second software component from within an execution of a first software component. A stub start log data is recorded in an instrumented stub before the invocation of the second software component. A stub end log data is recorded in the instrumented stub after a response is received from the invocation of the second software component. The stub start log data and the stub end log data gather runtime information about execution of the second software component within the component-based software system. The monitoring is capable of gathering log data across a plurality of threads, across a plurality of processes, and across a plurality of processors. The log data may be retrieved and analyzed to produce timing latency information, shared resource usage information, application semantics information, and causality relationship information.

A method for displaying computer system runtime information comprises the steps of displaying a plurality of runtime information items in different hyperbolic trees. The method further comprises the steps of navigating and inspecting runtime information within each individual hyperbolic tree, and navigating between semantically linked hyperbolic trees.

DETAILED DESCRIPTION

Definitions

Figure 1:
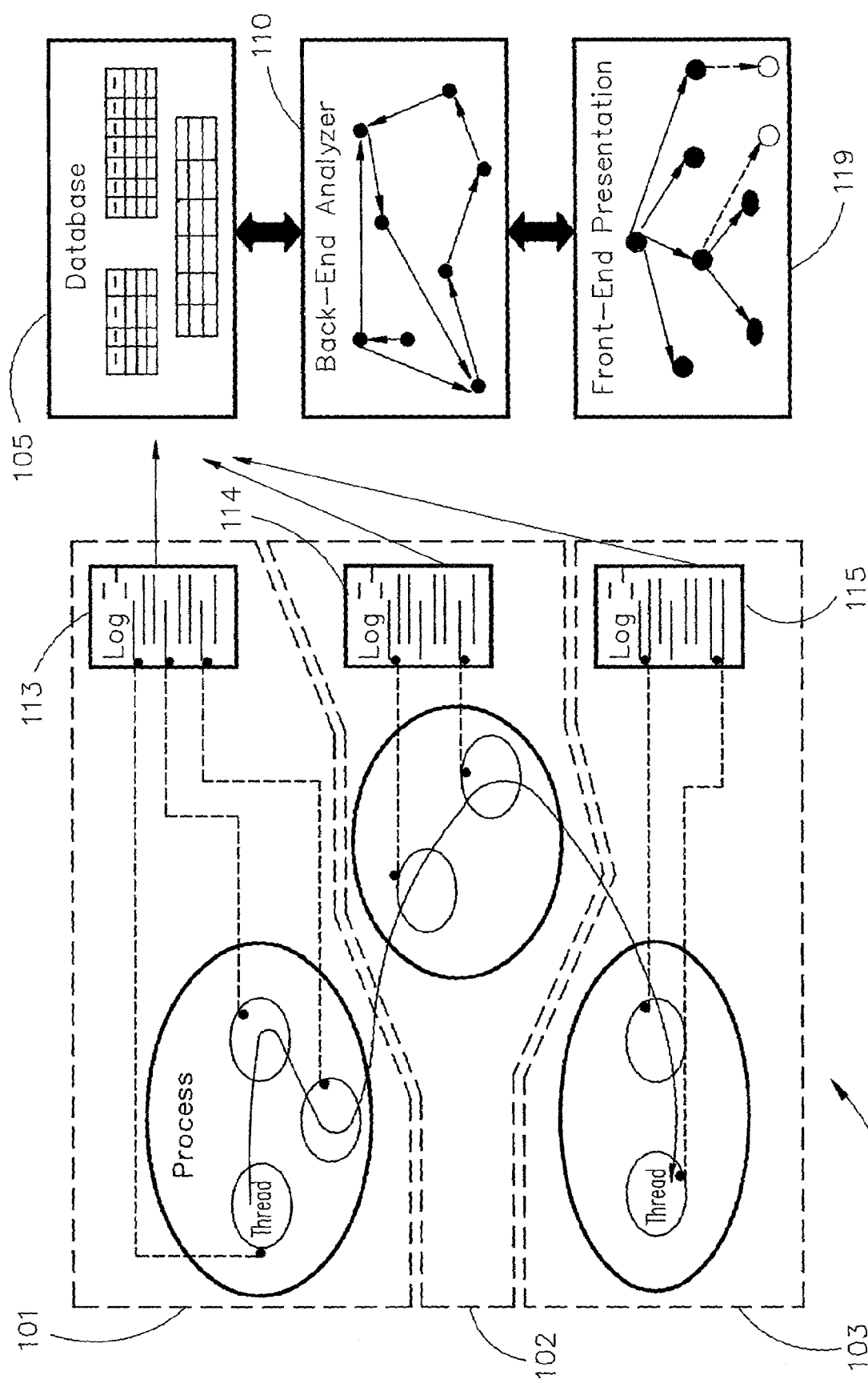
FIG. 1 is a diagram of a distributed computer system according to one embodiment of the invention.

A distributed system is a loose configuration of computers or computer devices that are interconnected by one or more networks or network links. A distributed system may include devices that are remote from each other. The devices on the distributed system may transfer data among themselves and may call and execute applications on other devices. This is especially true of component-based software, in which a software application is composed of components that each perform a specific task and operate according to well defined interfaces.

A component-based software system is a composition of a set of interacting software components, each of which provides and requests service from other software components. Each component has a well-defined interface by which the component exposes its interface to other components. A component's interface, therefore, may be used to provide services to other components and is used by other components to obtain services. In a component-based system, a user-defined software application defines how to implement the components in order to export services, and also defines how to accept and use services provided by other components. If the distributed system is implemented in an object-oriented manner, a software component is created as an object, and such service provision and request is through object method invocation associated with the software components. An application may therefore be created by assembling relevant components.

Component-based systems are built on an underlying remote procedure call model (i.e., invocations on remote components appear as if the invocations were on local libraries or objects). This abstraction layer is accomplished by using a stub object/routine on the caller side and a skeleton object/routine on the callee side. The stub converts an invocation into a message to a remote thread (or process), while the skeleton converts a message into a local invocation on the originally intended component. While the stub and skeletons can be created using many different methods, it is common for these elements to be created from a formal description of a component's interface. This formal description is specified in an Interface Definition Language (IDL). The IDL interface declares a set of operations, exceptions, and attributes. Each operation has a signature which defines at least its name, its parameters, its result, and its exceptions.

An exception is an operational error that occurs during execution of an application (i.e., a runtime execution error). An exception generally indicates that the data processing violated processing parameters in some manner. A typical exception may be an input of a function invocation that does not match specified value range, for example.

A software application may be called and executed over a distributed system. The application may be resident on one computer device and may be called and executed by that device or by other devices on the distributed network. A software application may generate multiple function calls to a plurality of different software components and may process various types of data.

An object is a computational grouping of operations and data into a modular unit. An object is defined by the interface it presents to others, its behavior when operations in its interface are invoked, and its state. An object is typically used to describe how a subsystem in a distributed application performs seamlessly with other subsystems of the same distributed application. The purpose of an object is to enable a distributed application to be designed in an object-oriented manner.

A thread is an independent execution sequence of program code inside a process. Threads are execution entities through which the function invocations are carried. One or more threads are caused by and related to a function call. A thread may spawn other threads, and multiple threads may occur simultaneously on a distributed system.

In this invention, a function is an operation defined in a component IDL specification, i.e., a call across software component boundaries. A function performs a specific data manipulation when executed. For example, a print function may be called and given data to print. The print function may process the data to put it into proper format and may select a specific printer driver. The caller and callee can be co-located in the same process, or can be located in different processes in the distributed system. If the function caller and callee are not co-located in the same process, the corresponding function invocation is referred to as a remote invocation. A software component is composed of a set of functions, each of which has a defined function interface.

Application semantics is a term that describes runtime operating behavior of a software application. Application semantics may include runtime information, such as which function calls which other function, what is the pre-condition and post-condition of a function invocation, why an exception occurs during function execution, etc.

The Common Object Request Broker Architecture (CORBA) is a standard for distributed object communication that was created by the Object Management Group (an open membership, non-profit consortium that provides and maintains computer industry specifications for inter-operable enterprise applications). CORBA is the most widely used distributed object standard for connecting operating system platforms from multiple vendors. The CORBA specification includes an interface definition language (IDL) which is a language-independent way of creating contracts between objects for implementation as distributed applications.

The Remote Method Invocation (RMI) is a mechanism that allows invocation of a method on an object that exists in another address space. The other address space may be on the same computer device or on a different one. The RMI mechanism is an object-oriented mechanism similar to CORBA.

The Microsoft COM/DCOM client (Component Object Model/Distributed Component Object Model) is Microsoft's specification for distributing and using COM objects across systems in the network. The COM/DCOM client may be used to make requests to a server. COM/DCOM clients can be written in visual basic, C++, Perl, or other languages in the WINDOWS environment.

Body of the Description

FIG. 1 is a diagram of a distributed computer system 100 according to one embodiment of the invention. The distributed system 100 is a multi-threaded software system under a monitoring operation. An application executing on the distributed system 100 may be partitioned in multiple processes, located on different machines, and supported by different operating systems (such as Windows NT, HP Unix, VxWorks, etc.). The distributed system 100 includes a plurality of processes such as processes 101, 102, and 103. The various processes are linked by one or more networks or other links. Each process may store runtime information into a log file, such as in the log storage files 113, 114, and 115, for example. Monitoring information is displayed to the user by the front-end presentation interface 119.

One or more computer devices may host and execute a plurality of processes, such as the processes 101, 102 and 103. These processes may be generated by the software application executing within the distributed system 100. Each process may generate one or more threads. In addition, individual processes/threads may generate additional processes/threads. Specific log data is created for each function call invocation.

Figure 2:
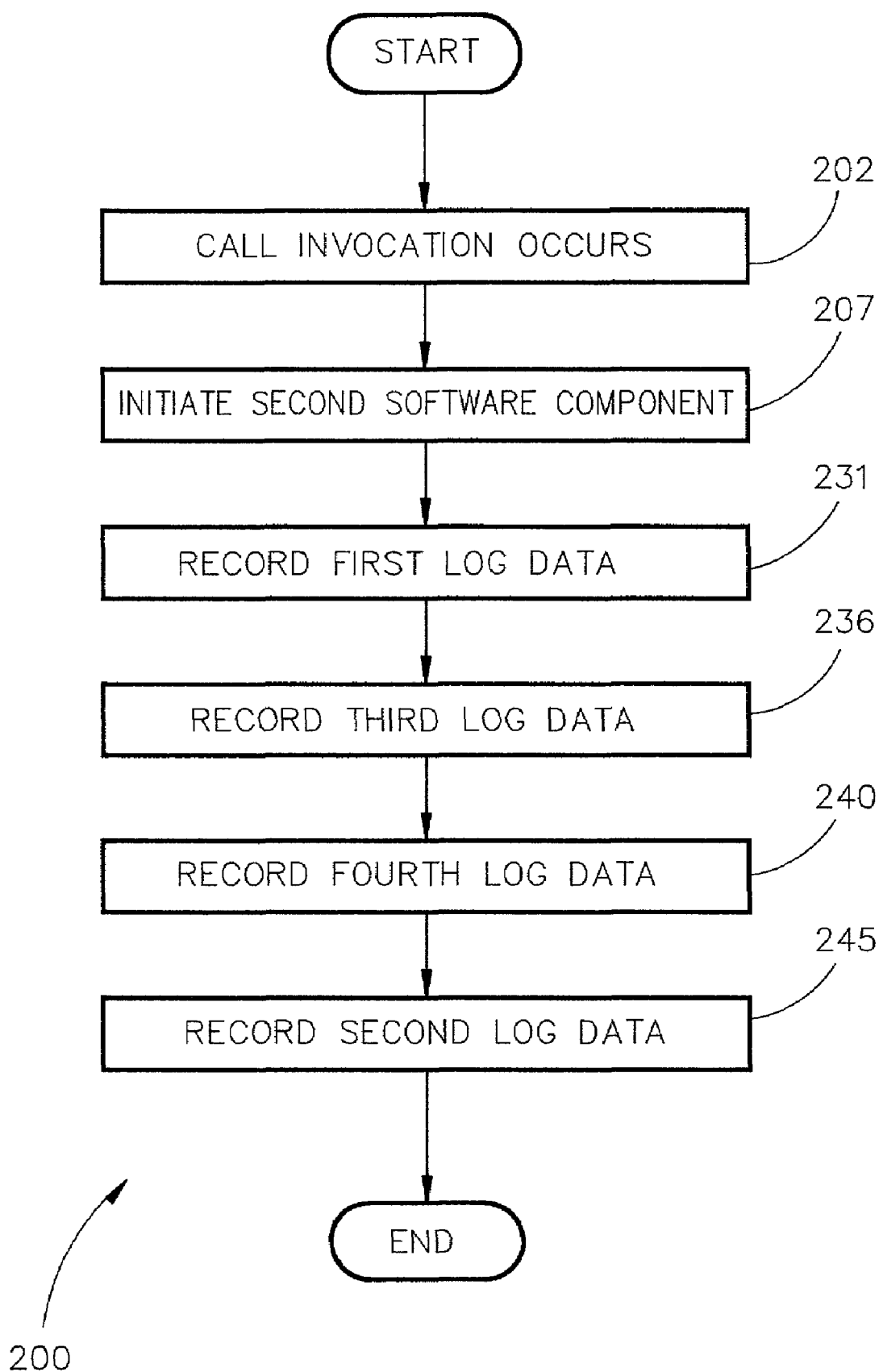
FIG. 2 is a flowchart of a monitoring method according to one embodiment of the invention.

FIG. 2 is a flowchart 200 of a monitoring method according to one embodiment of the invention. In step 202, a software function call invocation (of a first software component) occurs in a monitored application. The monitored application may be any type of object-based software application built using a component technology (such as CORBA, RMI, COM/DCOM, etc.) and running within the distributed system 100.

In step 207, the first software component may initiate a second software component, i.e., a software component executing on the distributed system 100 may call and initiate other software components. Calling may be a sibling-type calling wherein a first software component invokes a function call to the second software component, waits for the function return, and then issues another function call to either the second software component again, or other software components in the system. Alternatively, the call invocation may be a nested call to the child functions, wherein the first software component invokes a function call F to the second software component, which in turn invokes one (or more than one) function call to other software components during the performance of F's execution. In a nested call situation, consequently, the second software component may be invoked, complete (i.e., execute), and return before the first software component completes and returns.

It should be understood that the first software component may not necessarily invoke other software components. However, if subsequent software components are invoked, the monitoring method according to the invention can track and log the causality relationship between components, enabling a complete picture of software component execution within the distributed system 100.

In contrast to logging every function call in a process, a preferred embodiment of the invention instruments the application-meaningful events at the component's IDL description level. In this manner, causal relationships between components can be discerned without undue logging overhead. In another embodiment, other events internal to the component's operational behavior are logged and correlated along with the events logged and correlated at the IDL declared interface layer.

In step 231, a stub start (first) log data is recorded by an instrumented stub. The stub start log data is obtained from a first software probe issued by the instrumented stub (i.e., probe one). The instrumented stub is generated from an IDL interface description of the second software component. This is done so that data may be transported between the first and second software components in a manner that is independent of the underlying infrastructure and independent of the underlying communication protocol. The instrumented stub may be generated during the IDL compilation of the second software component. The stub start log data is recorded before the instrumented stub sends a message to the second software component, i.e., before the instrumented stub invokes the instrumented skeleton. The stub start log data may record several different data types, to be discussed below in conjunction with FIG. 3.

In step 236, a skeleton start (third) log data is recorded by an instrumented skeleton. The skeleton start log data is obtained from a third software probe (i.e., probe three). The instrumented skeleton is likewise generated from an IDL interface description of the second software component (again, see FIG. 3).

In step 240, a skeleton end (fourth) log data is recorded. The skeleton end log data is obtained from a fourth software probe (i.e., probe four). The skeleton end log data is generated by the instrumented skeleton at an execution conclusion of the instrumented skeleton. In this step, the skeleton end log data is recorded at about the time of the execution conclusion and the return to the instrumented stub, which may include a return of a function result to the instrumented stub. The implementation of the function which is invoked from the first software component is contained within the boundaries of the second software component.

In step 245, a stub end (second) log data is recorded by the instrumented stub. The stub end log data is obtained from a second software probe (i.e., probe two). The stub end log data is recorded after a response is received from the second software component.

Although the flowchart 200 depicts the initiation of the second software component as occurring before any data logging, it should be understood that the second software component may alternatively be initiated after the recording of the stub start log data/probe one.

It should be noted that although the figure shows capture and recordation of four log data items, a lesser number may be employed. For example, the monitoring according to the invention may employ only the instrumented stub and may only record the stub start and stub end log data, or even no data logging. This may be done for several reasons, including reduction of amount of logged data and logging scenarios where the causality relationship does not need to be fully captured.

In a preferred embodiment, the log events may log zero or more of the following data types: a timing latency data, an application semantic behavior data, a shared resource usage data, and a causality relationship data. The individual data types will be discussed below in conjunction with FIG. 3.

The monitoring method of the invention advantageously generates an instrumented stub and skeleton from an IDL description. The invention therefore performs monitoring at the IDL/interface layer (i.e., the invention does not record every function call that occurs in the system, but rather only those that occur at component boundaries). In the preferred embodiment, all logs are at the IDL layer. In an alternate embodiment, additional log entries can be added and correlated with the causal events logged at the IDL layer. The invention exploits the IDL layer so that it can log semantically meaningful events (i.e., the IDL function names), log the parameterization for the call (very difficult to do in message-based systems), and can track the causal chain. This has significant benefit over wire-logging mechanisms that log and analyze the lowest level messages sent between processes.

The data gathering of the invention is in contrast to the monitoring approaches of the prior art, which may be built on intercepting unacknowledged messages or intercepting resource requests (both prior art approaches are open-ended, and cannot track completion of processes or resulting causally-spawned processes). Therefore, unlike the prior art, the invention is able to fully characterize the operations of the software application within the distributed system 100. The instrumented stubs and skeletons perform logging of start and stop events in the stub and skeleton, and therefore capture a beginning and end of a function invocation and execution. This may provide a timing latency data for an individual software component. With the use of an instrumented skeleton, a timing latency for any causally linked software applications and functions may also be captured.

The monitoring is performed only for instrumented software components, although the distributed system 100 may include both instrumented and non-instrumented software components and applications.

In addition, the invention advantageously allows customization of the log data contents. The log data contents may include, for example, an application semantic behavior data, a timing latency data, a shared resource usage data, and a causality relationship data (see text accompanying FIG. 3). The monitoring according to the invention enables customization of the log data contents, and further enables the log data contents of each software probe to be independently selected. Therefore, the log data contents recorded by probe one may be different than the log data contents recorded by probe two, for example. What is more, the individual software of the instrumented stub and the instrumented skeleton may be empty and may generate no log data if desired.

Moreover, a particular instrumented stub may be capable of enabling and disabling a data logging capability of a corresponding instrumented skeleton. This capability enables control over a memory usage data logging and a thread causality data logging.

The log data contents may be selected/specified during compilation of a particular software application. In addition, the log data contents may be modified during normal operation of the distributed system 100. This may be performed by a regular expression specified by the user, independent of the IDL interface. The regular expression may be inserted into a particular software component during compilation, or alternatively may be provided by the user when the monitored system is running. When the regular expression is matched by a variable of event during execution, the log data contents may be changed.

As an example, the particular software component may include a regular expression that represents a particular pattern for function call chains. Therefore, if the particular function call chain occurs, the regular expression matches and a deeper logging may be triggered. The deeper logging could comprise modifying a software probe from not only logging a timing latency data and shared resource usage data but to also log an application semantic behavior data and a causality relationship data, for example. Therefore, a minimal data logging may be performed until a predetermined event or events occur, upon which a higher level of logging is initiated.

The method of the invention enables characterization of causality chains initiated by a user-defined software component. This is done by propagating a Global Causal Identifier between the stub and the skeleton, and by using local ordering of stub and skeleton events in combination with an event sequence numbering to give a total ordering over the call chain. Therefore, the log data can be analyzed and sorted to provide individual characterization data for particular causality chains. The characterization data may further include data regarding invocation and execution of each thread. Consequently, the monitoring may capture and characterize threads. Furthermore, the monitoring method achieves a cross-process causal tracing, wherein threads may be traced across processes and over multiple processing devices. Moreover, the monitoring can capture and correlate re-entrant execution of code (i.e., where a single copy of code is simultaneously executed by multiple threads). In addition, the instrumentation may support a local-bypass feature. Local-bypass is an option specified by the user to target the performance improvement that exists when the function caller and the function callee are co-located in the same address space (i.e., within the same process). In a preferred embodiment, all calls are routed through a stub/skeleton pair regardless of whether the target is remote or local. A local bypass optimization is performed (if the target is local) wherein the stub provides all log probes. This can be viewed as equivalent to having an empty skeleton. This may be viewed as a degenerate situation and the callee function invocation is directly performed in the stub. For instrumentation, the original third probe (corresponding to the skeleton start) and the fourth probe (corresponding to the skeleton end) can now be deployed before and after the callee function invocation in the degenerate instrumentation stub.

Another advantage of the invention is that the causality relationships for threads may be captured and characterized without capturing and characterizing the underlying component-based system runtime spawned threads. Therefore, the data logging discriminates between threads generated on behalf of a user-defined software application and threads generated on behalf of the underlying component-based system runtime infrastructure of the distributed system 100. Before passing on a thread for execution to the target operation, a skeleton adds a Marker to the current thread (using the thread specific storage or a global table). If threads are explicitly spawned during the target operation, the Marker will be propagated to the child threads. The Marker therefore indicates whether the thread is an infrastructure thread or an application thread.

In another advantageous feature, the monitoring method is capable of intercepting memory resource usage within the distributed system 100. Therefore, an instrumented stub or skeleton may globally intercept memory allocation and de-allocation requests and log these requests in order to track a dynamic (heap) memory usage. This global memory tracing may be enabled and disabled, and allows tracing across the distributed system 100.

A further unique feature of the monitoring method of the invention is that the causality information, and more generally any instrumentation data, may be passed from an instrumented stub to an instrumented skeleton. This may be done as an additional parameter in a function call. The IDL description therefore may be treated as if the function being monitored has an additional parameter. As a result, an instrumented stub may control the logging of an instrumented skeleton. Moreover, an instrumented stub may enable or disable an instrumented skeleton logging, as previously discussed.

In a further benefit, the individual data logs from the instrumented stub and the instrumented skeleton may be locally buffered and may be accumulated in a persistent storage. The accumulated data may be examined and correlated any time in order to determine behavior characteristics of the distributed system 100 or behavior characteristics of a particular software component within the distributed system 100. Therefore, an ongoing data logging may be later processed, put into an order, and examined in order to capture normal and erroneous behavior within the distributed system 100.

Referring again to FIG. 1, log data is generated during the execution of an instrumented software application and may be directly logged to a log storage file. Each process locally logs the resulting log data in the log storages 113, 114, and 115 (if the process contains software probes). Alternatively, the log data may be buffered to an in-memory, per-process buffer. The buffered data may be transferred to the log storage at some predetermined point in time, such as when the buffer is full or when the process gets terminated. The log storage may be a file system, for example.

The central repository 105 may be any storage device capable of receiving log data over the distributed system 100 and accumulating it, such as a database, for example. A relational database may be employed for the central repository 105, as it facilitates the remote logging capability and also maintains the semantic relationship between different types of data generated from different processes located in different computer devices. The log data from the one or more log storages is transported to and stored in the central repository 105. The transfer may occur at periodic times, may occur upon request by the analyzer 110 or upon request by the central repository 105, or may occur when a local log storage needs to be emptied. The central repository 105 may store data from a plurality of log storages, and is capable of logging a plurality of threads created by various processes in the distributed system 100.

The analyzer 110 may be located anywhere within the distributed system 100 and is not necessarily located on a machine that generates one of the log storages 113, 114, and 115. The analyzer 110 is capable of retrieving log data and manipulating the log data into meaningful results. The log data may be put into a report format, and may be transferred to a remote location, may be displayed to an operator, and may be printed out in a hard copy. The data and results may be displayed at a front-end presentation 119.

The analyzer may include an automatic instrumentation probe inserter (not shown). In order to monitor and characterize the runtime system behavior, the probe inserter may insert software probes into the existing software system's source code implementation to monitor the system and collect necessary monitoring data. Such probe insertion is automatic using current compiler technology.

After the probe inserter statically inserts the probes into the original system, the resulting code implementation is re-linked with some necessary instrumentation libraries. The compilation and linking produce new binary executable images. The executable images are deployed into the distribution system 100 based on a user-defined configuration. When the system is running, the probes produce the associated log data.

Monitoring can be introduced into the distributed system in two flexible ways. First, during the IDL compiler invocation phase, the user may specify which types of probes are included in which components of an application. Alternatively, at the runtime phase, when the distributed system 100 already has the software probes deployed, the user can turn the probes on and off on-the-fly (discussed below in conjunction with FIG. 10 and FIG. 11).

The analyzer may additionally include a monitoring data loader. The software probes produce log data in the threads when the system is running. For a truly distributed software system, the resulting log data can be scattered in different log files located in different machines. The data loader is responsible for collecting all these log data and storing the collected data into the central repository 105.

The analyzer 110 performs several types of system behavior characterization. The system behavior characterization analysis may be presented to a user in the form of a dynamic call graph. A dynamic call graph is a two-dimensional representation of a system-wide execution that shows the components of an application as nodes and shows the interactions between components as lines or arcs. A dynamic call graph therefore is a representation of application execution, and may illustrate the relative execution times, consumed memory, and actual function input/output parameters of application components and their call hierarchy. The dynamic call graph may additionally show the set of function invocations and the set of dynamically spawned application-level threads in the monitored system run, which are causally linked by a function caller/callee relationship and by a thread parent/child relationship.

The analyzer 110 may construct several pieces of information that may be used to understand behavior of a function in the distributed system 100. One is a dynamic call graph that illustrates a function's caller/callee relationship. All function invocations which share an identical Global Causal Identifier (GCID) are ordered based on increasing Event Numbers (each function invocation contains a stub and a skeleton). A dynamic call graph is produced from the ordered, collected log data. This is possible because the ordered function invocation is a language expression whose semantics may be defined by a state machine (described later). The call graph may be produced by consuming the events (i.e., the stub start, the stub end, the skeleton start, and the skeleton end events) one-by-one from the event chain embedded inside the ordered function invocations (similar to a C compiler parsing an input C file and producing an abstract syntax tree).

The thread parent/child relationship (and possibly the transitive of such relationship) can be similarly unveiled through the thread-related log data. By linking the function invocation nodes and thread nodes with function caller/callee relationship log data and thread parent/child relationship log data, a complete dynamic call graph may be constructed for each process executing in the distributed system 100.

The monitoring, according to the invention, is independent of the communication protocol and is independent of the network configuration. The monitoring according to the invention is capable of tracking a plurality of threads, including a plurality of threads generated by a single process. Furthermore, no globally synchronized timers are required. All timing-associated monitoring is based on the timers in each individual computer device, which are not necessarily synchronized.

The distributed system 100 therefore performs monitoring and characterization of the behavior of a multi-threaded and distributed system. The monitoring and characterization is capable of recording application semantic behavior, end-toend timing latency behavior, and shared resource usage behavior (such as CPU and heap memory usage). The monitoring of the invention enables users to understand how the distributed system 100 behaves and enables the estimation of how the impact of a change propagates through the entire system following semantic causal linkages. In addition, it enables users to specify a resource budget at the system level.

Figure 3:
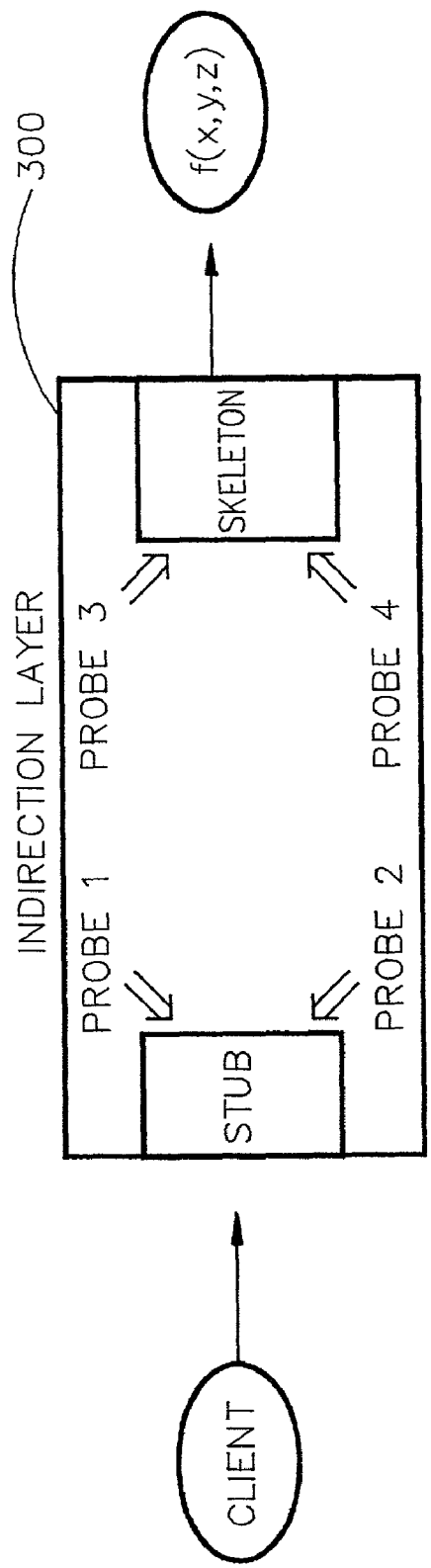
FIG. 3 is a diagram of a stub and skeleton design.

FIG. 3 is a diagram of a stub and skeleton design according to one embodiment of the invention. Component technology, such as CORBA, COM/DCOM, or RMI, creates an indirection layer to separate a function's caller and callee into different threads (or even different processes). The indirection layer comprises two major parts, a stub and a skeleton. During compilation, the stub and skeleton can be automatically generated by an IDL compiler. During normal operation, the stub and skeleton are issued as part of a function call from the client. A component object is accessible to and local to the callee (i.e., it is in the same process). A function implementation f(x,y,z) is defined in the callee component object.

The figure illustrates a function invocation f(x,y,z) in a distributed invocation manner, similar to the local function invocation occurring in a traditional sequential program. The automatic probe insertion mechanism of the invention leverages this auto-generation to produce the software probes located in the stubs and the skeletons. In order to achieve this, the functions which are eligible for monitoring and characterization are the ones whose function interface definition are specified in the IDL as part of the system implementation.

The stub and skeleton 300, according to the invention, include four software probes in the indirection layer. Probe 1 records data upon a function call by the invoking client. Probe 3 records data upon the receipt by the callee object to which the function call is associated. Probe 4 records data by the callee object upon completion of the function call (i.e., upon generation of an output or result associated with the function). Probe 2 records data when the client receives the return of function results (communication between the client and the indirection layer is bi-directional).

Probe location can be specified in different ways. In a default situation, all functions may receive probes. However, users can also selectively specify certain IDL interfaces to be instrumented (each IDL interface contains a set of function interface definitions).

There are four types of monitoring that are accomplished by the invention. Therefore there are four types of log data that are accumulated from the software probes. The four monitoring and log data types are: timing latency monitoring, shared resource usage monitoring, application semantic monitoring, and causality relationship monitoring. Causality relationship monitoring enables the other three types of monitoring data to be linked between different functions and between different threads generated by a distributed application being monitored.

Timing Latency Monitoring

For timing latency monitoring, each probe obtains a time stamp from the local machine when the probe is initiated, and again when the probe is finished. All four probes collect timing latency log data. The difference between the time stamps at the probe two conclusion and the probe one initiation reveals the end-to-end timing latency of the function. The timing latency data may be presented in a tabular form associated with each interface function, or may be directly annotated to an associated dynamic call graph.

As an example, suppose a function "foo" exists in an application. In its implementation, it first invokes a function "times" to query how many times the subsequent invocation of a function "say_it" has to be iterated; then it invokes a second function "what_to_say" to query the string information that the subsequent invocation of the function "say_it" is going to use. It then invokes a function "say_it" for the number of times specified in the function "foo". The associated code is shown in the following example.

```
void Class A::foo( ) {
    ...
    //obj1, obj2, and obj3 are three remote objects identified already.
    int counter = obj1times( );
    String content = obj2->what_to_say( );
    for (int i=0; i<counter; i++) {
        obj3->say_it(content);
    }
    ...
}
String ClassA::what_to_say( ){
    ...
    Thread *thread_1 = new Thread ((Thread_Start_Function)f1);
    Thread *thread_2 = new Thread ((Thread_Start_Function)f2);
    ...
}
```

Suppose that the three invocations of the function "say_it" respectively took 3.2, 3.4 and 3.6 milliseconds to finish, the function "what_to_say" took 4.1 milliseconds to finish, the function "times" took 2.7 milliseconds to finish, and the function "foo" took 20.0 milliseconds to finish. A table for the statistical information (average, standard deviation, minimum and maximum) may be created, to be associated with the function "times", the function "say_it", and the function "what_to_say". As the dynamic call graph is constructed, it can be determined that out of the total 20.0 milliseconds of timing latency, 2.7 milliseconds (14%) is spent on the function "times", 4.1 milliseconds (21%) is spent on the function "what_to_say", and 3.2 milliseconds (16%), 3.4 milliseconds (17%) and 3.6 milliseconds (18%) are spent on each of the three "say_it" function invocations respectively. Note that there is still 14% of elapsed time left over, which is therefore the portion spent on the local computation of the function "foo" itself.

Shared Resource Usage Monitoring

For shared resource usage monitoring, such as CPU usage or heap memory usage, the probes are configured in a manner similar to the configuration of the timing latency monitoring. All four probes collect shared resource usage information when the probe is started and again when the probe is finished.

In terms of CPU and memory usage, different operating systems offer different degrees of accessibility to such usage information retrieval. It is very likely that in some operating systems additional libraries will be required in order to collect and transform information from the underlying operating system.

One type of shared resource is dynamic memory allocation (i.e., heap memory) that is requested by both a user application and by the component-based system runtime infrastructure (which in CORBA is called Object Request Broker, or ORB, for example). This can happen when a library call of "malloc/free" (in C) or "operator new/delete" (in C++) is invoked, for example. A memory management subsystem may be located between the component-based system runtime infrastructure and the operating system. The memory management subsystem may employ an interceptor to intercept each memory request and forward the request down to the operating system (discussed below). Upon receipt of the memory request, the memory management subsystem may gather per-thread memory usage information. This information can be exported to the probes in the stub and skeleton.

One large drawback of current operating systems is that they do not allow heap memory usage information (i.e., dynamic memory allocations) to be directly retrieved. The monitoring of the invention provides such a capability through use of a memory allocation request interceptor.

A memory usage interceptor of the invention is realized by the interceptor functions that are interposed in a memory request operation (the term interceptor herein is not related to any of the CORBA interceptors). An interceptor intercepts dynamic memory allocation and de-allocation requests from both the user-defined application and from the component-based system runtime infrastructure (the requests are directed to the underlying operating system). The interceptor relays the memory requests while also monitoring the corresponding memory transaction. As a result, a per-thread dynamic memory usage statistical information can be collected in the interceptor and be exported to the instrumentation probes located in the instrumented stubs and skeletons.

Dynamic memory allocation/de-allocation is performed through a limited number of pre-defined standard library calls in the respective programming language. In the C programming language, the standard C library functions "malloc" and "calloc" may request a portion of memory from the underlying operating system, and a standard C library function called "free" may request the de-allocation of a portion of memory. In the C++ programming language, in addition to the supported C standard library function calls stated above, an operator "new" may be used to request a portion of memory to accommodate a newly constructed object. The operator "delete" may be used to request the de-allocation of a portion of memory after the requested object has been destroyed.

The interceptor enabling may be accomplished by using a well-known compilation pre-processing technique called macro re-definition. The technique uses a header file in which standard library function calls are re-defined to channel dynamic memory requests through two newly-defined interceptor function calls, such as "PH_malloc" and "PH_free", for example. For the C++ interceptor operators such as "new" and "delete", the C++ language feature called global operator redefinition may be used. With this feature, dynamic memory usage requests through "new" and "delete" are forwarded to the interceptor functions "PH_malloc" and "PH_free". The responsibility of "PH_malloc" and "PH_free" is to collect the per-thread memory usage request information and update a per-thread statistical information. The per-thread statistical information may include, for example, a minimum usage, a maximum usage, and an average usage. The re-defined interception operators (i.e., "PH_malloc" and "PH_free" in this example) forward the memory usage request to the original, non-instrumented C standard library call (i.e., "malloc" and "free").

The interceptor includes a unique capability of identifying where the memory usage request is from, so that memory usage requests from a user-defined software application can be distinguished from memory usage requests from the component-based system runtime infrastructure. This is achieved through library marking. The component technology runtime infrastructure is composed of one or more libraries. One integer is reserved to mark a library or libraries. The marking is conducted by introducing a "marker" parameter in the "PH_malloc" and the "PH_free" function interface, in addition to the normal parameters required for memory allocation and de-allocation. During library construction, all source code files under compilation have to go through a macro re-definition and/or a global operator re-definition process, in which a marker designated to a library or libraries is supplied to each "PH_malloc" or "PH_free" call instance. Similarly, a separate integer is reserved to mark the libraries corresponding to the user-defined application code. With the markers, when the whole application is running, the memory usage interceptor knows where the request comes from and can distinguish between dynamic memory requests from the component-based system runtime infrastructure and dynamic memory requests from a user-defined software application.

The analyzer 110 may generate a CPU usage report. Unlike a sequential operation where a function execution is conducted in a unique processor, a distributed function call can be spawned through multiple processes and multiple processors. Therefore, the CPU usage may be represented in a vector format <$C_1, C_2, \ldots C_N$> where $C_i$ represents the CPU usage of processor $P_i$ and the total number of processors in the system is N.

The CPU consumption may be characterized in different ways. In a first embodiment, the CPU consumption tracks consumption caused only by the individual functions, and does not track any CPU consumption from the semantically linked functions and threads. Therefore, the function consumption is always obtained from two portions, the stub and the skeleton. The stub and skeleton may be executing within the same process or within two different processes (possibly located in two different processing devices).

In a second, more sophisticated embodiment, the CPU consumption is viewed as a propagation activity. Therefore, by following the defined causality relationships (including both function caller/callee relationships and thread parent/child relationships), all of the CPU consumption from the involved child function calls, as well as the dynamically spawned threads in the middle of these function invocations, are charged to the consumption of the function. This may be done because the function is the initiator of the resulting chain of function invocations and spawned threads.

The analyzer 110 may produce a CPU usage report in a tabular representation similar to the one associated with timing latency analysis, or may be annotated to both the thread nodes and the function nodes in the dynamic call graph.

Returning again to the code example given in the timing latency section above, the function "what_to_say" spawns two threads during its function execution (i.e., thread 1 and thread 2). In terms of system configuration, assume that the execution of the function "foo" is performed on Processor A, the function "times" is performed on Processor B, the function "what_to_say" is performed on Processor C (as well as thread 1 and thread 2, which are spawned by the function "what_to_say"), and the function "say_it" is performed on Processor D.

For this example, from a simplistic point of view, assume that only the CPU consumption spent on the function implementation body is taken into account by the analysis. In this example, it is given that by measurement it has been determined that the function "foo" consumes 3.2 milliseconds of processing time on Processor A, the function "times" consumes 2.7 milliseconds of processing time on Processor B, the function "what_to_say" consumes 3.0 milliseconds of processing time on Processor C, and each invocation of the function "say_it" consumes 2.6, 2.6 and 2.6 milliseconds respectively of processing time on Processor D. Thread 1 consumes 1.8 milliseconds of processing time on Processor C and thread 2 consumes 2.2 milliseconds of processing time on Processor C.

Similar to the timing latency characterization, the CPU characterization (average, standard deviation, maximum and minimum CPU consumption) can be determined for each function and represented in a tabular format. In reconstructing a dynamic call graph for the function "what_to_say", the execution of the two spawned threads 1 and 2 should be taken into account. Therefore, the total CPU consumption for the function "what_to_say" should be 3.0 milliseconds (self) plus 1.8 milliseconds (from thread 1) plus 2.2 milliseconds (from thread 2), for a total of 7.0 milliseconds. Likewise, the total CPU consumption for the function "foo" is <3.2, 0, 0, 0> milliseconds (for the invocation of the function "foo") plus <0, 2.7, 0, 0> milliseconds (from the invocation of the function "times") plus <0, 0, 7.0, 0> milliseconds (from the results for the function "what_to_say", calculated above) plus <0, 0, 0, 2.6> milliseconds (from the first invocation of the function "say_it") plus <0, 0, 0, 2.6> milliseconds (from the second invocation of the function "say_it" plus <0, 0, 0, 2.6> milliseconds (from the third invocation of the function "say_it"), or <3.2, 2.7, 7.0, 7.8> milliseconds, for a total of 20.7 milliseconds. This result indicates that in order to perform the function "foo", the entire distributed system has spent 3.2 milliseconds, 2.7 milliseconds, 7.0 milliseconds, and 7.8 milliseconds on Processors A, B, C, and D respectively on behalf of the function "foo" invocation. It should be noted that without the causality relationship that has been captured by the invention, it would be impossible to identify and measure resource propagation, such as CPU consumption.

If Processor A, B, C, and D are identical, the CPU processing time percentage spent on each function invocation may be calculated. In this example, it can be determined that 15.5% of the processing time is spent on the function "foo", 13.0% is spent on the function "times", 33.8% is spent on the function "what_to_say", and 12.6% is spent on each invocation of the function "say_it".

Application Semantic Monitoring

The application semantic monitoring captures data within a function call, i.e., it captures the function name, the associated interface name, and input/output parameters, function return results, exceptions, etc. Probe one records the function input parameters. Probe two records the function output parameters and function returns, as well as any exceptions that have occurred. Probes three and four do not record any application semantic monitoring data. Only either one of probe one and probe two is required to record the function name and the associated interface name.

Because the analyzer 110 can access all of the application semantic information, timing information, and shared resource log data information stored in the central repository 105, many analyses can be implemented using SQL (Structured Query Language) queries. For example, the analyzer 110 may determine whether specific user-defined exceptions have occurred during execution. If exceptions have occurred, the analyzer 110 may determine the associated functions. For example, the analyzer 110 may determine whether any runtime processes have exceeded a maximum heap memory usage, and the amount of the overage. Furthermore, the analyzer 110 may determine any function invocation instances that reflect such abnormality, including their input/output parameters. Moreover, the analyzer 110 may determine whether a particular input/output parameter associated with a particular function always matches a predetermined predicate, such as "a>0", "a<0", or "a=0", for example. In addition, the analyzer 110 may determine the frequency with which a specific exception is caused by a particular function.

Causality Relationship Monitoring

The monitoring, according to the invention, also captures a causality or relationship tracing that enables monitoring of a function caller/callee relationship, even in multi-threaded applications. The causality relationship tracing also enables a monitoring of a thread parent/child relationship. Because the probes record only local behavior at the stub or the skeleton, such local logging information is useful only when it is causally linked over the whole distributed system 100. In order to accomplish causality relationship tracing, the invention records the following information at all four probes: a Global Causal Identifier (GCID), a Local Function Identifier, an Event, an Event Number, and a Thread Identifier, and a Marker.

The GCID is a Universally Unique Identifier. The uniqueness is over both space and time. During a monitoring operation, the GCID associated with a function F is carried from F's stub to F's skeleton, and carried further down to the functions which are directly or indirectly invoked from F. The Global Causal Identifier (GCID) does not propagate to the child threads which may be spawned in the implementation of F or the functions directly or indirectly invoked from F.

The Local Function Identifier is a serial number that identifies a sequence of stub/skeleton invocations local to each process, and is started from 0 for each individual process.

The Event identifies which probe is occurring, and may be a stub start, a stub end, a skeleton start, or a skeleton end.

The Event Number gives each event a unique number in the function call chain. The Event Number is started from 0 and is sequentially increased for each encountered event (the stub start, the stub end, the skeleton start, and the skeleton end). As a result, the event counter is incremented at each probe in the function call chain.

The Thread Identifier is a unique number assigned to each thread (a child thread will have a Thread Identifier that is different from the Thread Identifier of the parent thread) in a process. The Thread Identifier for each individual process is sequentially increased by a thread constructor in the thread library in order to indicate which logical thread is the computational carrier of this function. The marker is a Boolean label to indicate whether the current function body under execution is from the user-defined application code or not. The marker of "true" states that the current function is from the user-defined application code, and "false" otherwise.

The above items of information are collected for the purpose of function caller/callee causality relationship derivation. However, in order to infer a thread parent/child relationship, the Thread Identifier alone is not sufficient. In order to keep track of which thread is dynamically created on behalf of which function's execution, the following additional data items are gathered: a Self Thread Identifier, a Parent Thread Identifier, and a Function Container Identifier. These three data items are logged during the execution of the thread constructor in order to record data for each dynamically spawned thread T. The data items generated by these additional logging processes are then separately recorded in a thread table associated with each individual process.

The Self Thread Identifier is a unique serial number in a process. The Self Thread Identifier is generated for each thread being monitored, and is retrieved from the sequentially increased counter (starting from zero) in the thread constructor.

The Parent Thread Identifier is included in a child thread and identifies a parent thread. In a thread table, the Parent Thread Identifier for thread T is the Self Thread Identifier of the thread that dynamically spawned the thread T.

The Function Container Identifier generates a greater-than-zero unique number for a function in a process. It is a copy of the Local Function Identifier of the function F if the thread T is spawned from the function F. The Function Container Identifier is only paid attention to by the skeleton, namely, probe three and probe four. This is because F's implementation is invoked after probe three, and it is the threads that are spawned inside F's implementation that are user-defined and are of interest.

Although the instrumentation probes are primarily allocated in the stubs and skeletons, the thread parent/child causality relationship tracing requires that the above three data items be obtained outside of the previously discussed probes (except the Function Container Identifier). Therefore, the required additional data items are obtained through an instrumented thread library. The thread library provides an abstract interface for thread construction, thread manipulation, and thread coordination. The thread library may also provide other synchronization primitives to the upper layer (i.e., both the component-based system runtime infrastructure and the user-level application), independent of the underlying operating system. By inserting the probes into the thread library, such as the thread constructor, the lifetime span of a thread may be determined. In addition, the resource usage associated with the thread and the parent-child relationship may be determined.

Additional Monitoring

In order to reveal process configuration, namely which function is executed in which process residing in which machine, the invention independently records the following process information: a Host Name, a Process ID, and a Process Universally Unique Identifier (Process UUID). The Host Name is the name of the machine or computer device where the process is located. The Process ID identifies a unique serial number with respect to the host machine where the process is located, and is typically assigned by the operating system. The Process Identifier is unique in each individual machine during the system run. The Process UUID is a universal identifier for a process across the Internet. Such process-wide logging information is logged separately from the log data associated with each individual probe.

Figure 4:
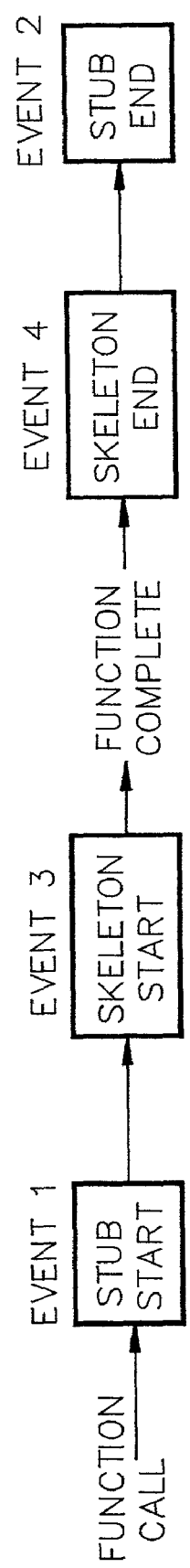
FIG. 4 shows the chronological steps of a monitoring process for a single thread.

FIG. 4 shows the chronological steps of a monitoring process for a single function invocation, with event one being the stub start, event three being the skeleton start, event four being the skeleton end, and event two being the stub end. Events one and three occur after the function invocation and before the function completion. Events four and two occur after the function completion. The figure therefore shows the sequence of stub and skeleton activation of a single function call.

The four events occur within an invocation and execution of the function associated with a second software component. A second software component may be invoked from within the first software component, with the invocation of the second software component potentially occurring at any point in time in relation to the four events shown.

Figure 5:
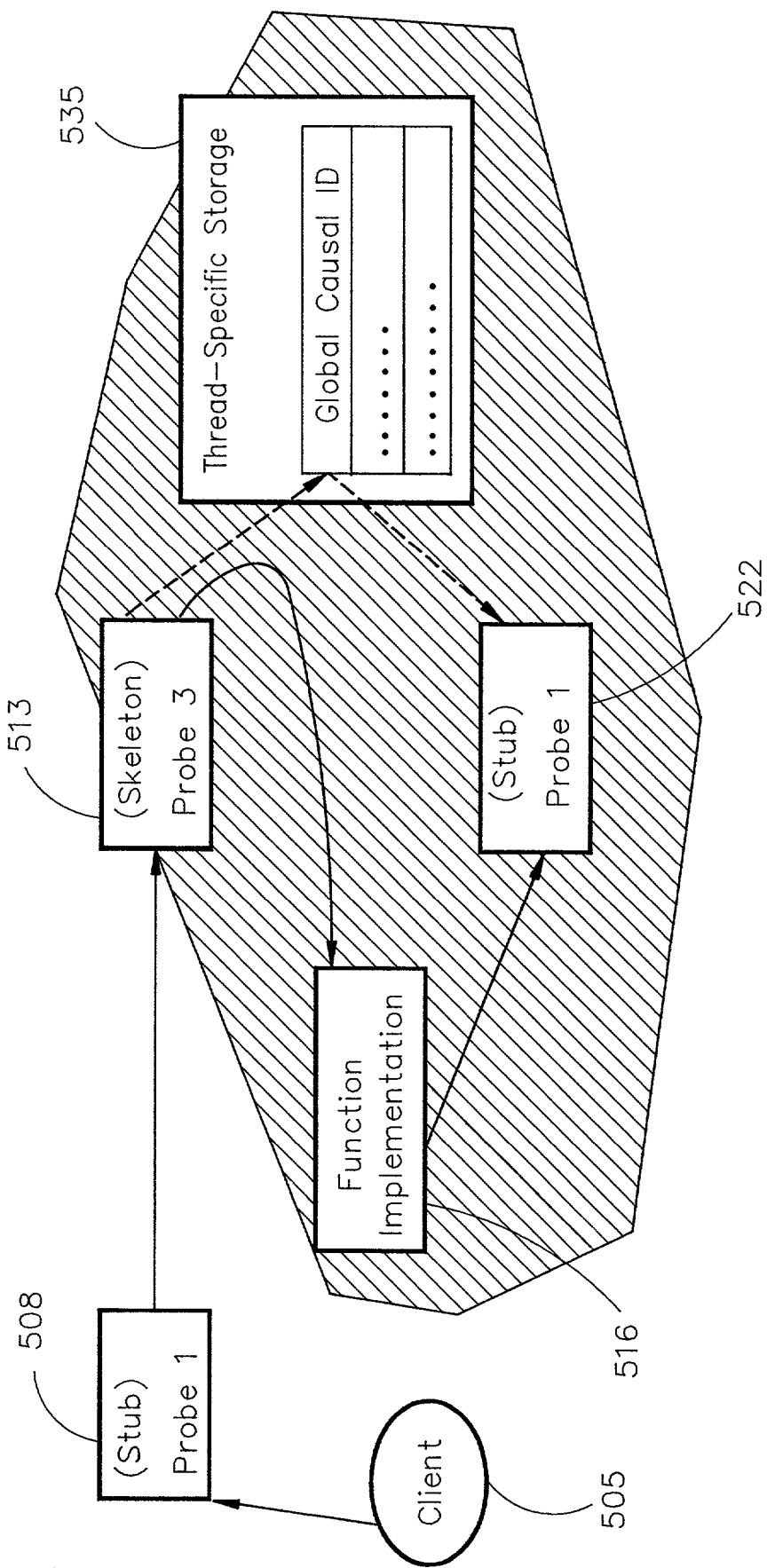
FIG. 5 is a process diagram of a relationship transportation for causality tracing.

FIG. 5 is a process diagram of a function caller/callee relationship transportation for causality tracing according to another embodiment of the invention. The client 505, which may be any component-based software application issuing a function call, generates a stub start probe one 508, which passes a portion of function call log data to skeleton start probe three 513, along with the normal function call data. This portion of function call log data is called function-transportable log data. The function-transportable log data may include the Global Causal Identifier (GCID) and the Event Number. The passing is done through the communication channel between the stub (probe one 508) and the skeleton (probe three 513).

Although the arrows in the figure indicate data transport in one direction only, it should be understood that data may also be transported in a reverse direction as the function returns. For example, probe four (not shown in this figure) corresponds to probe three 513. Probe four will transport back the updated function-transportable log data to probe two (not shown in this figure) along with the function return parameter (probe two corresponds to probe one 508).

The actual data transportation is accomplished by an additional transport parameter that is added virtually to the IDL interface. This transport parameter is passed between an instrumented stub and an instrumented skeleton. This is done without changing user-defined application code. This transportation may be done to avoid modifying the user-defined code associated with the function implementation 516. Therefore, by combining the private communication channel (used by the component system runtime infrastructure to transport normal function data between the stub and the skeleton), and the thread-specific storage 535 to bridge such private and possibly different communication channels, the function call log data (such as a Global Causal Identifier) may be seamlessly transported along the full function call chain.

The data transport between a stub and a skeleton may be done in order to accomplish a function caller/callee relationship tracing through a function-transportable log data. This may include transport of the Global Causal Identifier (GCID) and the Event Number of probe one 508.

Inside the function implementation 516, another function call may be invoked, such that a child function probe one 522 is generated. Since the function implementation 516 and the child probe one 522 are always located in the same thread, the further transportation of a portion of the function call log data (i.e., the skeleton start log data) from probe three 513 to child probe one 522 is performed through a shared storage mechanism. This portion of function call log data is called thread-transportable log data. The shared storage mechanism may be implemented by a thread-specific storage 535. After the transported portion of the function call log data (i.e., function-transportable log data) is received by probe three 513, at least a portion of this skeleton start log data is stored in the thread-specific storage 535, and may be later retrieved by the child function's probe one 522. The at least a portion of the skeleton start log data may be updated before it is stored in the thread-specific storage 535. This may include incrementing an Event Number before storage.

The child function probe 522 retrieves the log data from the thread-specific storage 535, updates it, and then repeats the transportation process starting from the instrumented stub to the instrumented skeleton (described above), as function control keeps propagating along the function call chain.

Figure 6:
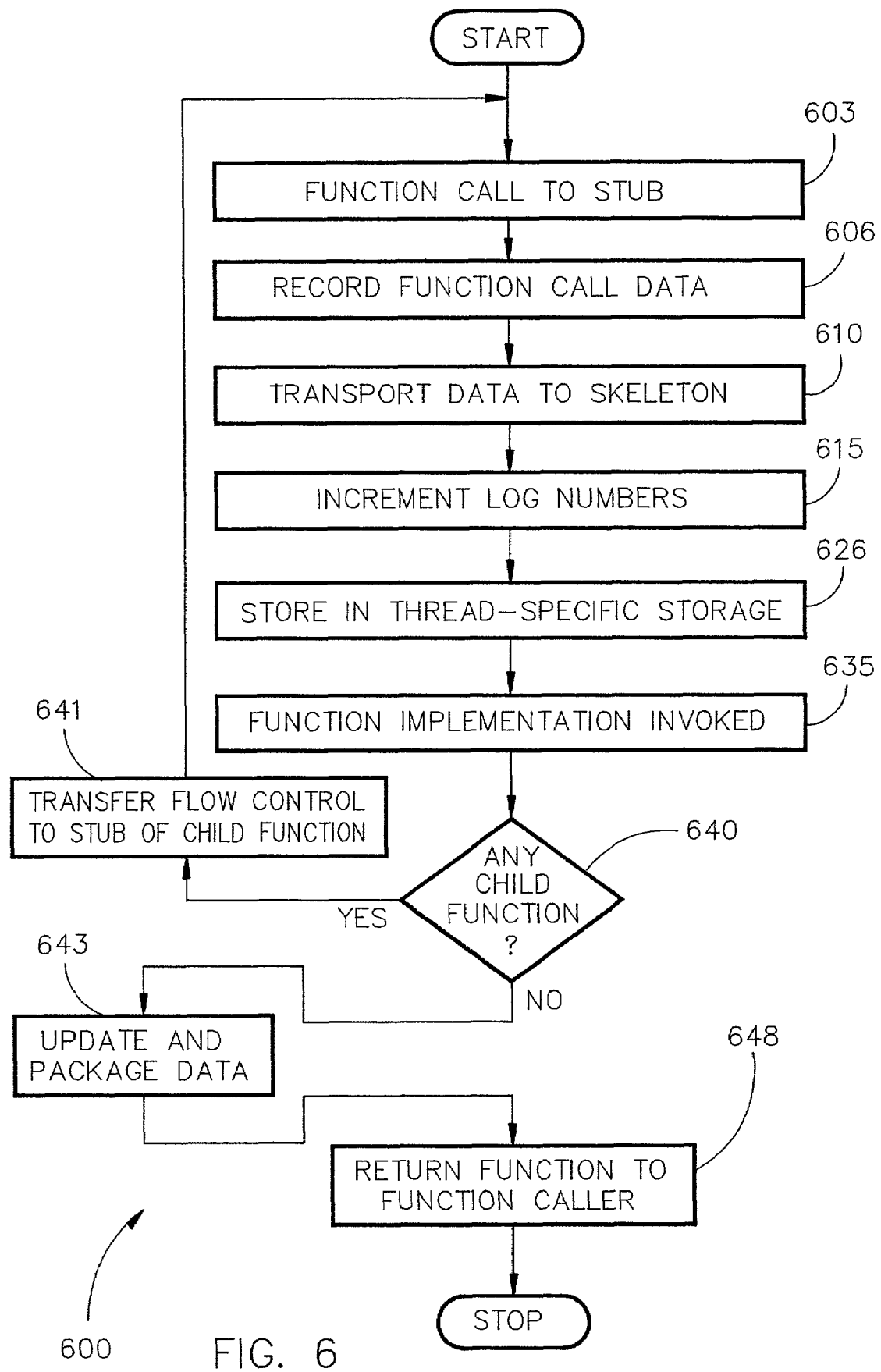
FIG. 6 is a flowchart of an execution sequence method for tracking a function caller/callee relationship.

FIG. 6 is a flowchart 600 of an execution sequence method for tracking a function caller/callee relationship. The flowchart 600 shows an execution sequence that fulfills a seamless function call log data transportation such as that shown in FIG. 5. In step 603, a function call to a stub occurs.

In step 606, probe one is issued and the function call data is recorded, as previously discussed.

In step 610, a particular portion of log data is transported from the stub to the skeleton, i.e., from probe one to probe three (namely, function-transportable log data). The log data therefore is transported along with the normal function call data.

In step 615, specific log numbers may be incremented to reflect the current probe and event. For example, the Event Number from the function-transportable log data will be incremented in each issued probe. In addition, the Local Function Identifier and the Thread Identifier may change.

In step 626, the updated function-transportable log data transported from probe one 508 to probe three 513 is also stored in thread-specific storage 535, as previously discussed.

In step 635, the function implementation is invoked, i.e., the function receives data and starts executing.

In step 640 it is determined whether there is any child function invocation within the current function implementation. If not, the method proceeds to step 643; otherwise, it branches to step 641.

In step 641, flow control is transferred to the stub of the child function, and the method branches back to step 603 in order to process the child function.

In step 643, the function-transportable log data is updated and packaged in probe four for transport. The updating may include incrementing the Event Number. The packaging may include adding communication-neutral transport data or converting the function-transportable log data into a communication-neutral format. When the function-transportable log data is received by probe two in the instrumented stub (along with any function invocation response from the skeleton), probe two conducts any necessary further updating. Probe two then stores the updated information into it's thread-specific storage, to be ready for the subsequent function invocation's further causality tracing.

In step 648, since there is no child function invoked, the flow control of the function returns to the function caller. Note that if a function call implementation contains multiple cascading child function calls in its implementation body, the above-mentioned transportable log data is still transportable between such child function calls by using the above private communication channel and thread specific storage mechanism. As a result, at least some data may be required to be updated and packaged for transport.

Therefore, the method uses a thread-specific storage to bridge the log function data-passing activity defined in step 610. Together, a seamless log data transportation mechanism is formed. In addition, the figure shows how the log numbers, such as the Event Number, etc., are incremented during the monitoring process in order to trace all aspects of the function call chain.

Figure 7:
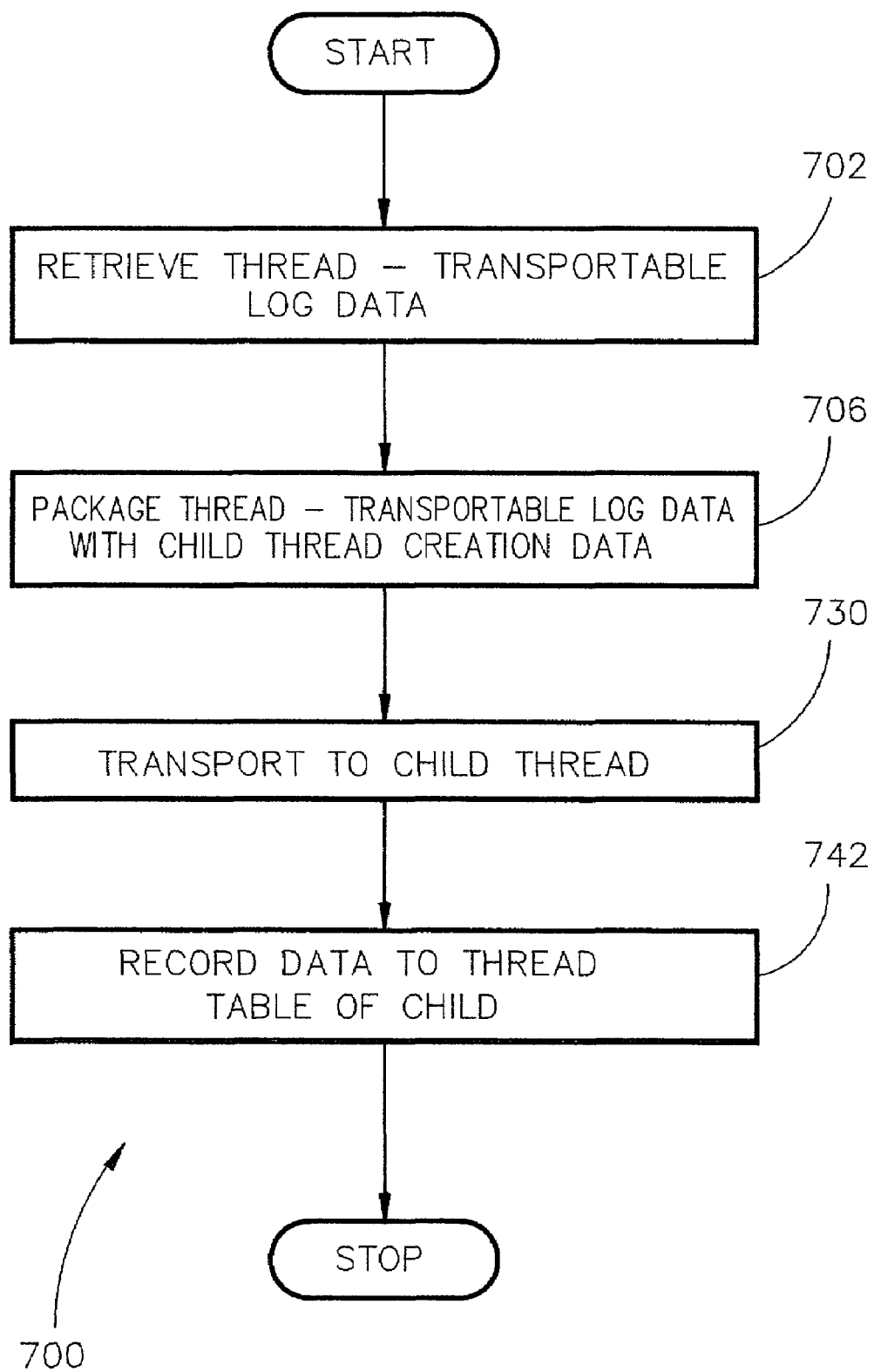
FIG. 7 is a flowchart of a method for transporting log data from a parent thread to a child thread.

FIG. 7 is a flowchart 700 of a method for transporting log data from a parent thread to a child thread according to one embodiment of the invention. This may be done in order to trace a thread parent/child relationship. In step 702, thread-transportable log data from a parent thread is retrieved from a thread-specific storage. The thread-transportable parent log data is typically generated by probe three during the function call, and may include the Thread Identifier, the Local Function Identifier, and a Marker. The Marker may be used to distinguish a user-application-spawned thread from a thread spawned directly by the underlying component-based system runtime of the distributed system 100. The Marker may be excluded if the Thread Identifier is capable of providing the distinguishability, or if system threads are desired to be logged and characterized. It is assumed that the child thread is created with some passed (original) function parameters from the parent thread.

In step 706, the thread-transportable log data is packaged with the actual function parameters of the function which will be the entry point of the newly created thread.

In step 730, the parent thread packaged data is transported to the child thread when the child thread is created by the operating system. This transportation is fulfilled by the operating system.

In step 742, the transported data is recorded to a thread table of the child thread along with the thread information associated with the current child thread. This may include unpackaging the transported data. In addition, applicable log values may be updated, such as the process wide sequence number associated with thread identifiers, etc.

Two types of composition relationships exist in multi-threaded applications: a thread can be invoked during function execution (i.e., a thread-invoke-function relationship), and a thread can be spawned during a function execution (i.e., a function-spawn-thread relationship). The monitoring of these two types of relationship is a by-product of the function caller/callee and the parent/child thread determinations. The reconstruction of these two types of cross-linking relationships is performed by using logged data. If function F1 spawned thread T6, then thread T6's Function Container Identifier will be identical to function F1's Local Function Identifier. It can be determined that thread T1 invoked function F9 if T1's Self Thread Identifier is identical to function F9's Thread Identifier.

In contrast to the function caller/callee relationship determination, the thread relationship reconstruction is relatively straightforward. A thread T1 is a parent to thread T2 if thread T1's Self Thread Identifier is identical to the Parent Thread Identifier of thread T2.

Figure 8:
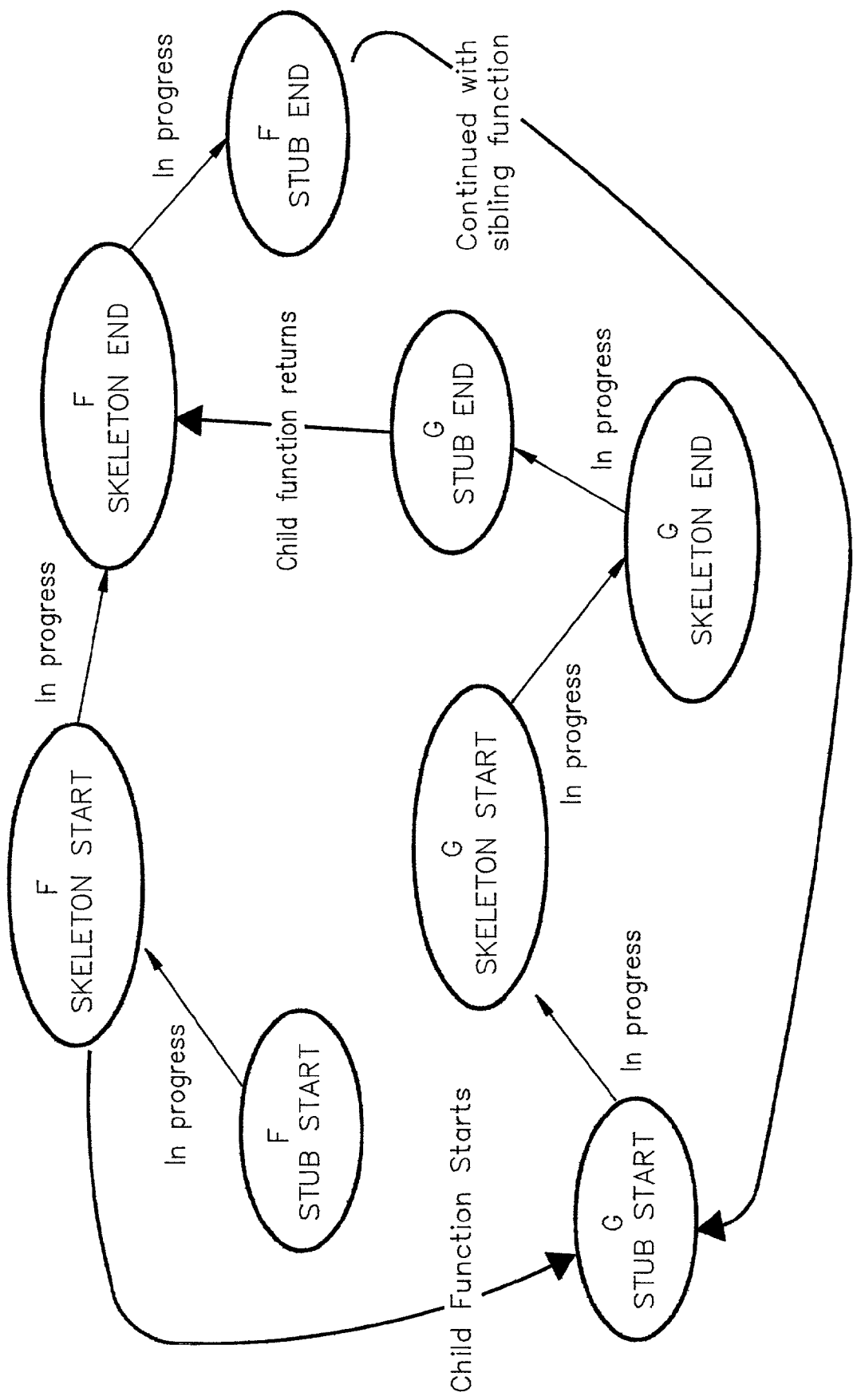
FIG. 8 is a state transition diagram that illustrates a function caller/callee relationship determination.

FIG. 8 is a state transition diagram that illustrates a function caller/callee relationship determination. The figure illustrates how the analyzer 110 may differentiate between a parent/child relationship (caused by nesting of function calls) and a sibling relationship (caused by cascading function calls). In preliminary steps (not shown), a set F' of unique Global Causal Identifiers are identified (in the log storage 105). If the set F' contains data, a specific Global Causal Identifier xy is used to retrieve all applicable function log records. The retrieved function log records are sorted into an ascending Event Number order.

The analyzer 110 scans through the sorted array of function log records and identifies the states associated with the log records. Each state is represented by the function name, by the stub or the skeleton, and by the start/end Event.

A transition from one state to another may be used to generate a parsing decision. A decision of "in progress" between two states indicates that the two adjacent log records come from the normal execution of a function call, whose execution sequence is defined in FIG. 4. A decision of "child function starts" indicates that subsequent log records come from a child function of the current log record function. A decision of "child function returns" indicates that subsequent log records come from a parent function of the current log record. A decision of "continued with sibling function" indicates that the next log record comes from a function immediately following the return of the function associated with the current log record.

In a function call implementation, there exist two general function call patterns. A first pattern is a sibling function relationship. In a sibling relationship, function F may call multiple other functions G1, G2, in a cascading manner. The functions G1, G2, etc., are called sequentially by function F in order to implement function F (i.e., function F calls function G1, and after function G1 completes and returns then function F calls function G2). This function call chain of G1, G2, etc., forms a sibling function relationship. This first pattern is solely determined by the "continued with sibling function" event.

The second pattern is a parent-child function relationship. In a parent-child function relationship, function F calls function G and function G subsequently calls function H. Function G does not complete and return until after function H completes and returns. The function calls therefore are said to be nested. This second pattern is determined by the "child function starts" and the "child function returns" events.

The figure only shows how to determine the function caller/callee relationship when there is no runtime execution failure in the system, such as a crash. There may be an additional "abnormal" transition state (not shown) that is called if the two adjacent log function records do not follow any of the transition patterns shown in the state transition diagram. If that happens, the analysis will indicate the failure and the analysis is restarted from the next log record.

Figure 9:
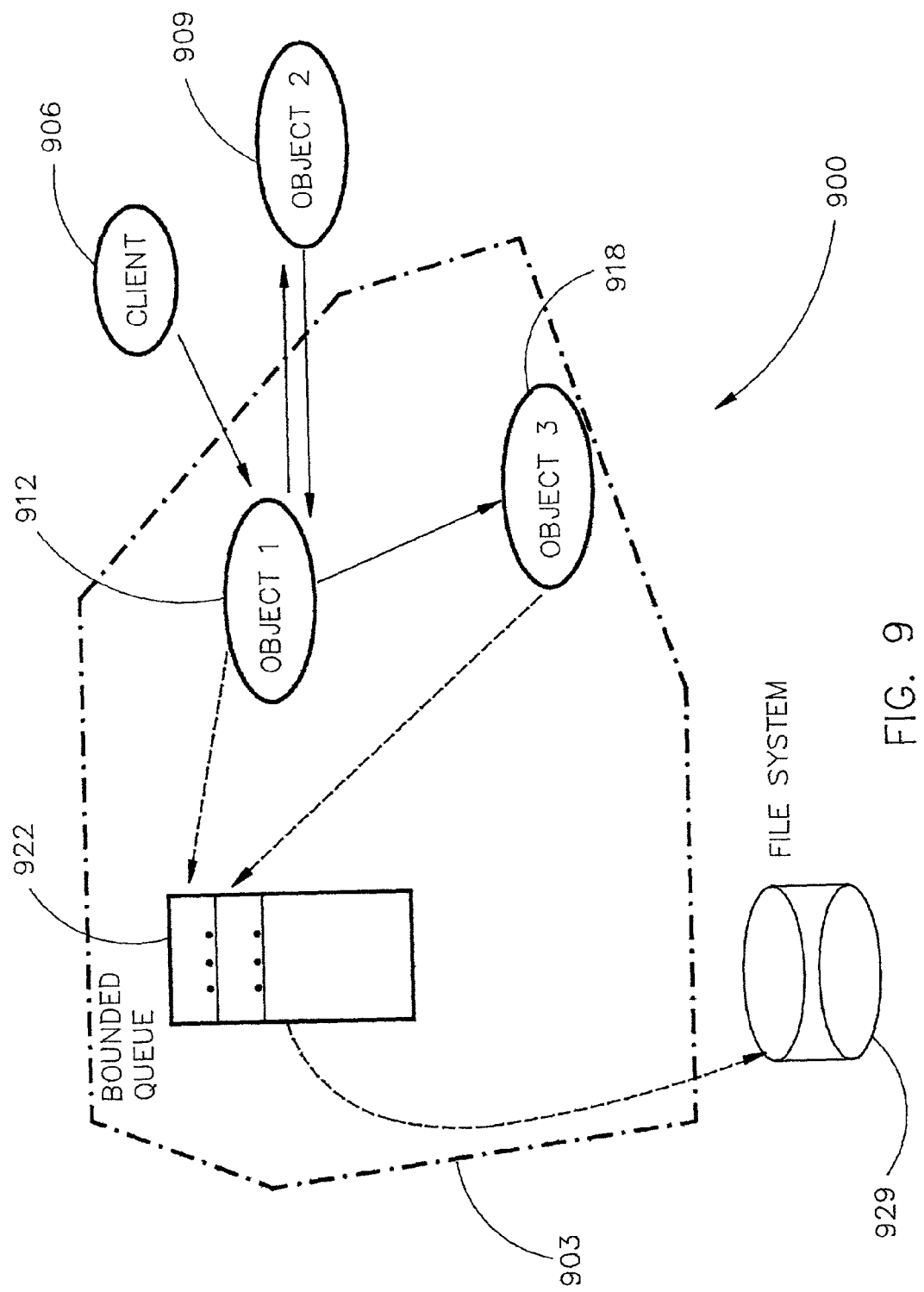
FIG. 9 is a process diagram of data accumulation and storage.

FIG. 9 is a process diagram of data accumulation and storage according to one embodiment of the invention. The figure therefore illustrates how the log data may be accumulated locally. Each log file is associated with a process. In process 903, a client 906 (i.e., an application) invokes a function call F associated with a first object 912. The first object 912 may further invoke a call associated with a second object 909, which may be outside the process 903 but yet inside function F's implementation (i.e., a child function is invoked). Either one or both objects may further invoke method (function) calls associated with a third object 918. The log data from object 912 and 918's function invocation is first transported to a log storage 922, such as an in-memory bounded queue, for example, where it is temporarily stored. Since the second object 909 is located in a process separate from process 903 (which includes the first object 912 and the third object 918), the log storage 922 receives log data from only the first object 912 and the third object 918, and not for the second object 909.

The data logging may be performed as a per-process action. When a system run is finished, the contents of the local log 922 may be flushed to a file system 929 for long-term storage. The flushing may occur when the log storage 922 is full or when the application (which is initiated by the client 906) is terminated. The files may be transferred to a particular directory in a particular machine through a data transportation protocol such as FTP, for example. From there, the log data may be stored to a remote database through a database access protocol such as JDBC (suitable for Java implementation) or ODBC (suitable for C++ implementation).

Because the log data is scattered in different processes located in different machines, a data provider and a data collector are not necessarily running on identical machine platforms. As a result, the log data should be presented in a machine-neutral format. For example, the log data generated in a first machine should be able to be reconstructed in a second machine. Since such data neutrality is known in the art, it may be employed to package and transport data in a binary and neutral format.

The data storing process may include the following steps. First, the data structure associated with the log data is defined in the IDL specification. Second, the IDL compiler may be run to produce a set of classes which have methods to marshal and de-marshal the log data. A marshalable object is an object that can be converted to other formats and otherwise processed for transfer. Third, when the in-memory buffer is full, the stored log data may be converted into marshalable objects. Marshalable refers to the ability to convert the data to other transient formats, such that the object information can be sent/received through the Internet or a file system in a binary and neutral manner without information distortion. The original object can be subsequently reconstructed from the transient format. Fourth, by invoking the marshaling method of a converted object, the log data may be processed and handled in a neutral binary format. Such binary data may be stored into the central repository 105. Fifth, when the log data file is fetched to a central data collector, the de-marshaling associated with the converted objects may then be invoked and the original objects re-constructed.

The central repository 105 is the final log data storage site. In a database embodiment of the central repository 105, the database may be advantageously used to structure the log data from different processes located in different computer devices. This may be done in the database by following different types of semantic relationships. In addition, a SQL database language may be used for data manipulation and analysis. The SQL database language may provide a generic and efficient API (Application Program Interface) to retrieve and manipulate the stored log data both at a system characterization phase, and at an end-analysis result presentation phase.

Figure 10:
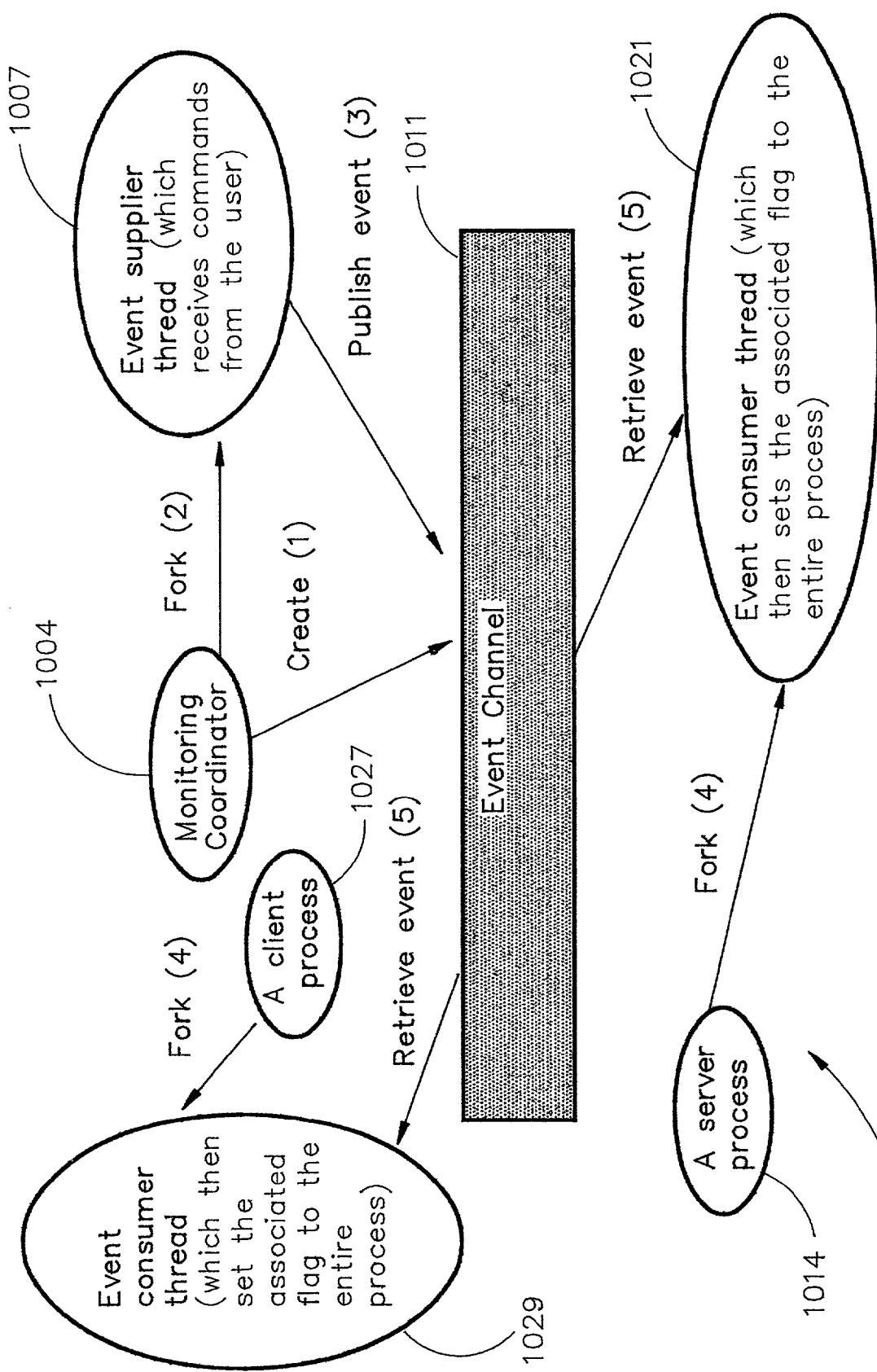
FIG. 10 is a process diagram of a monitoring embodiment for a selective monitoring framework, wherein minimal data logging may be done in order to reduce the amount of gathered data.

FIG. 10 is a process diagram 1000 of a monitoring embodiment for a selective monitoring framework, wherein minimal data logging may be done in order to reduce the amount of gathered data. System monitoring using a fixed configuration of probes may gather a significant amount of log data. This may impact the performance and behavior of the system under monitoring. Furthermore, concurrent monitoring probes can potentially interfere with each other, and therefore affect the accuracy of the monitoring result. For instance, application semantic monitoring probes unavoidably introduce monitoring overhead to both CPU and timing latency monitoring. Therefore, it may be desirable to reduce the data produced by the probes to only the portion which is significant to an underlying monitoring. Additionally, the monitoring may be further streamlined by allowing probes to be dynamically enabled or disabled, based on the monitoring being performed.

The monitoring process 1000 includes a monitoring coordinator 1004 that is started before any user (client) and server processes are created, and is always running. The monitoring coordinator 1004 creates an event channel 1011. The monitoring coordinator 1004 then creates an event supplier thread 1007, which can receive user commands from input interfaces (such as the keyboard), and can push the event to the event channel 1011. After the creation of the monitoring coordinator 1004, a user's client and server processes are started. A server or client process may spawn an event consumer thread 1021 or 1029. The event consumer thread pulls the event from the event channel 1011 and performs subsequent actions.

For example, in this process diagram the event channel 1011 is first created and then the event supplier thread 1007 is generated by an application call. The event is published into the event channel 1011, after which a client process 1027 and a server process 1014 may each generate event consumer threads 1029 and 1021. The event consumer threads 1029 and 1021 may be generated simultaneously or at different times. Each consumer thread always listens to the event channel and pulls the event when the event is published in the event channel 1011. Each process then turns on/off the corresponding probes based on the event received by the consumer thread.

Figure 11:
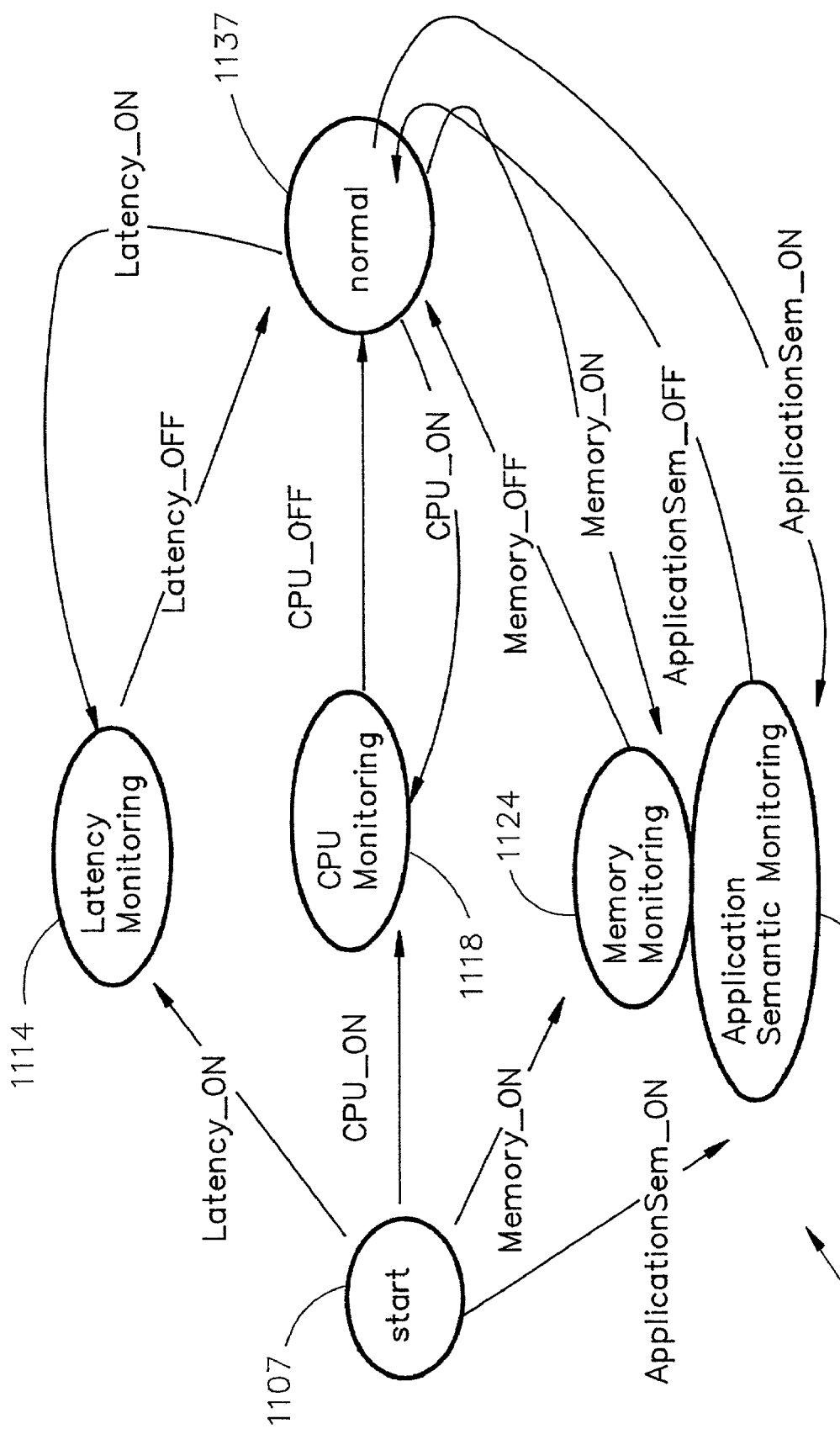
FIG. 11 is a state transition diagram for the selective monitoring framework.

FIG. 11 is a state transition diagram 1100 for the selective monitoring framework. It shows four different monitoring types (application semantics, memory usage, CPU usage, and timing latency). Each monitoring type can be flexibly turned on or off. There are eight different monitoring events: ApplicationSem_ON, ApplicationSem_OFF, Latency_ON, Latency_OFF, CPU_ON, CPU_OFF, Memory_ON, and Memory_OFF. Beginning from the start state, where the monitoring coordinator 1004 starts, the state transition diagram shown in FIG. 11 describes a state protocol for selecting monitoring types.

When a "Latency_ON" command is published by the monitoring coordinator 1004 and is subscribed to by each consumer thread, the monitoring system selects the latency measurement. This also applies for "CPU_ON" and "Memory_ON". In the selective monitoring framework, a single monitoring type can be selected for each monitoring session. A monitoring session is defined as a time interval for the transition from "start" to "normal", or for the transition from "normal" back to "normal". After the monitoring coordinator 1004 issues the monitoring off event of "Latency_OFF", "CPU_OFF," or "Memory_OFF", the monitoring type is terminated and the system goes to the normal state 1137 within a finite amount of time. From the normal state 1137, the system can transition to any other type of monitoring, but not without returning to the normal state 1137. Each event receiver globally sets the monitoring flag to be on or off which is then visible to the entire process with respect to the designated corresponding monitoring type.

As a result, a timing latency monitoring, a shared resource usage monitoring, an application semantics monitoring, and a causality relationship monitoring are capable of being selectively enabled and disabled. Furthermore, a stub start probe, a skeleton start probe, a skeleton end probe, and a stub end probe are capable of being selectively enabled and disabled.

In normal operation, it is possible that a function invocation may occur right before a client or server process receives an "off" event. This may trigger a set of subsequent function invocations and may therefore cause the issuance of a set of dynamically created threads throughout the distributed system 100. As a result, it will be difficult, if not impossible, to determine the reach or duration of a "normal" state in the distributed system 100. It is imperative that these functions and threads execute and are monitored, even though the "off" event has been allowed to execute and the "off"event has been set. Therefore, in some instances the "normal" state should not be immediately reached after the "off" event is set.

To cope with the fact that the reaching of the "normal" state cannot be absolutely determined, the monitoring and the analyzer 110 are designed so that either the monitoring result can be guaranteed to be consistent or that the failure to reach the "normal" state is detected and reported to the user. If the failure is reported, the inconsistency can be avoided in the next run of system monitoring by waiting until the monitoring reaches the "normal" state.

The consistency is defined by two criteria. Criterion 1 is that no required monitoring is discontinued by a state transition, and criterion 2 is that no required monitoring is interfered with by a state transition.

Criterion 1 is always guaranteed by the technique called causal overriding. When a function is invoked by another function, or a thread is created by another thread, the causality relationship is continuously tracked, including the function caller/callee relationship and the thread parent/child relationship. After the "off" event has been received, if a function is still called from another active function requiring the monitoring activation, or if the function is contained in the thread whose parent thread requires the monitoring activation, then this function locally turns on the respective monitoring. The criterion may be set via an application event or via a debugger hook.

An interference happens when the instrumentation probes of the monitoring framework process compete for a shared resource with the original application. Criterion 2 is automatically satisfied for application semantics monitoring, as no shared resource usage is concerned. Criterion 2 can be compensated for by monitoring of the shared resource usage (such as CPU and heap memory usage), as these types of monitoring are thread-based. For shared resource usage monitoring, if the monitoring occurs simultaneously in two different threads then no interference between threads can occur. The only interference left is intra-thread. Since the execution inside a thread is always sequential, the resource spent on the probes (i.e., the interference), can be recorded in log records and be subtracted out later by the analyzer 110.

For the monitoring of timing latency, the interference cannot be easily measured and compensated when there exist multiple functions with different Global Causal Identifier simultaneously executed on the same processor. The difficulty exists because the timing latency interference is across the boundary of the thread, the process, and the processor. As a result, the timing latency interference may become system-wide. In this case, if log data captures the start and end of the function invocation in both the stub and the skeleton, it may be determined whether a particular function is interleaved with another function invocation. If the interleaving does occur, it will become part of the report presented to the user, and the user can take action to reduce or eliminate the interference by employing on-the-fly on/off probing.

Therefore, according to this embodiment of the invention, different monitoring types, such as execution time and timing latency, may be controlled by a user or application in order to minimize impact on the system and confine the monitoring framework only to the degree that is truly desired by the user. For example, the user may wish to turn one or more of the monitoring features off at times when a large amount of processing time is required. This may be done in order to reduce impact on the host computer device running the application. Likewise, at times where the user desires more information on the runtime execution of the application, the user may turn on more of the monitoring types in order to collect additional data. For example, the user may choose to enable more monitoring to understand the root cause if the system is experiencing a large number of exceptions.

The instrumentation probing in the thread library and in the memory management subsystem may be configured to be permanent. However, they may be implemented so that they can be turned on or off to some degree in order to cope with the probes inside the stubs and the skeletons and therefore to minimize the monitoring overhead and interference.

The monitoring framework of the figure may also be employed to achieve a selective component monitoring, wherein a user can specify that a monitoring operation be turned on or off for a software component. For selective component monitoring, an event may be encoded as [host, interface, function, on ] or as [host, interface, function, off]. The interface and function fields specify the monitoring function and the associated interface. The host field indicates that only the function invoked from that particular computer device will be monitored. Any one of the first three fields can be absent and replaced by a wildcard operator (such as "*"). The wildcard operator may be interpreted to be any host, any interface, or any function. When such an event is broadcast system-wide through the framework, the monitoring system can enable and disable specific functions.

FIG. 11 is applicable to selective component monitoring, and the corresponding events now become [host, interface, function, on] and [host, interface, function, off]. The casual overriding is still applied to meet Criterion 1. Generally Criterion 2 can be met by interference avoidance through the feedback of the analyzer, similar to the recommended treatment for timing latency monitoring described previously. Moreover, a component monitoring (e.g., Component A) and a data type monitoring (e.g., CPU usage) can be superimposed to form a comprehensive selective monitoring framework. Consequently, a user may control both monitoring aspects in order to tailor the monitoring operation to the needs of the user.

The monitoring and characterization of the invention yield several major advantages. One advantage is an application-centric and thread-based multi-dimensional behavior monitoring and characterization in an integrated framework. The monitoring and characterization system is based on user-defined function calls. Besides causality relationship reconstruction, monitoring includes characterization of system behavior including 1) the application semantics (i.e., function input/output parameters, exceptions occurring during runtime execution, etc.); 2) the end-to-end timing latency of function execution; and 3) the CPU consumption, heap memory usage, and other shared resource consumption for each function call.

Another advantage is a system-wide capturing of resource consumption and timing propagation due to causality tracing of threaded applications. The two types of causality relationships tracked are a function caller-callee relationship and a thread parent-child relationship. By identifying such causality relationships in the distributed system 100, the propagation of timing latency and resource consumption in the distributed system 100 may be captured and recorded.

Yet another advantage of the invention is that the monitoring according to the invention is independent of the hardware platform, independent of the operating system, independent of the communication protocol, and does not need a globally synchronized clock provided in the network. Therefore, the invention enables runtime monitoring of all processes in the network, even multi-threaded, multi-processed and multi-processored functions.

Yet another advantage is an automatic probe insertion by an IDL compiler and a flexible probe activation/deactivation. An IDL compiler can automatically insert software probes into the system code base. The flexible probe activation/deactivation may be accomplished at compilation or at runtime. The interface can be specified, the interface function can be specified, and the monitoring type can be specified (application semantics monitoring, timing latency monitoring, CPU consumption/heap memory usage monitoring, or some combination of these). Moreover, a probe may be designed so that it can be turned on or off when the system is running in order to control the amount of log data information.

Yet another advantage is that by leveraging component technology such as CORBA, COM/DCOM and RMI, the invention is capable of dealing with truly distributed application systems. Consequently, an application system can be multi-threaded, partitioned into different processes, run on different processors, and scheduled and managed by different operating systems.

Figure 12:
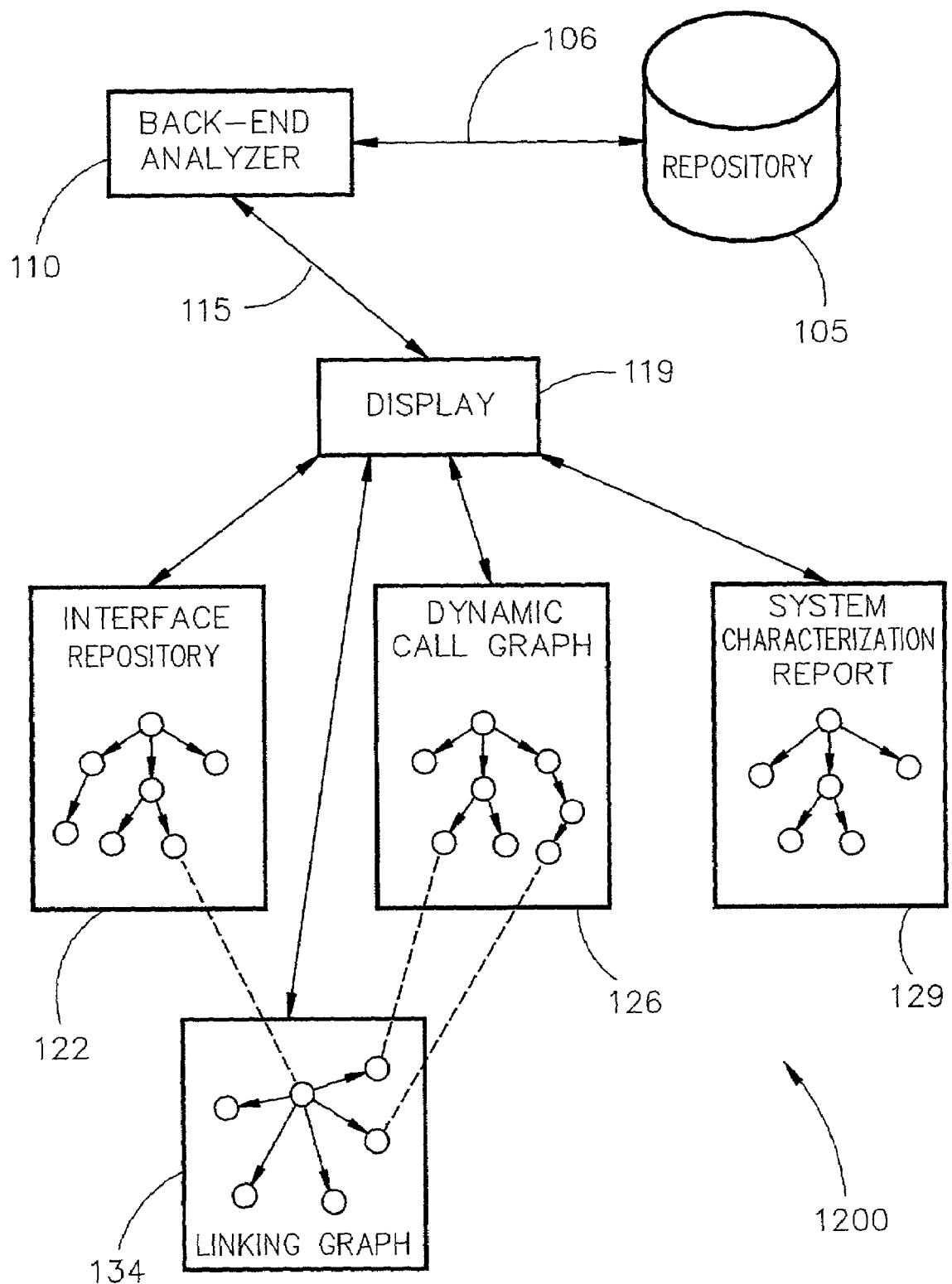
FIG. 12 shows a visualization system for displaying runtime information from a computer system, according to one embodiment of the invention.

FIG. 12 shows a visualization system 1200 for displaying runtime information from a computer system, according to one embodiment of the invention. The system 1200 may include a central repository 105, a back-end analyzer 110, and a display/front-end presentation 119. The analyzer 110 may be connected to the repository 105 via a first communications link 106, such as a computer network, the Internet, a wire or cable, a wireless communication channel, etc. The display 119 may be connected to the analyzer 110 via a second communications link 115, such as a wire or cable, a computer network, the Internet, etc.

The central repository 105 may be any type of information storage device, such as database, a file system, etc., that can store large amounts of runtime information gathered from an associated component-based computer system. The repository 105 alternatively may be comprised of more than one storage component. The analyzer 110 retrieves data from the repository 105 and processes it in order to form data for the display 119.

The display 119 may be any type of display device that includes hardware support in the form of a CRT monitor or LCD display, such as a network workstation, a personal computer (PC), a notebook or laptop computer, etc. The display 119 may include any necessary user-interface related software support. The display 119 may show a variety of information displays to the user, including an interface repository display 122, a dynamic call graph 126, a system characterization report 129, and may additionally include a linking graph 134, when the linking graph 134 exists. If the display 119 is facilitated by a web browser, the web browser may display information in a browser window (see FIG. 18 and accompanying discussion).

In operation, the analyzer 110 may generate one or more encoded hyperbolic trees in a data format recognizable to the display 119. The analyzer 110 encodes the data from the repository 105 into a tree format, including some compact tree node information (such as, for example, a function name and an interface name), and tree structure information (i.e., which tree node is linked to which other tree nodes in the hierarchy). An encoded hyperbolic tree may be stored as a ".tre" file. Such files can be generated in advance, or may be dynamically generated upon the request of the user.

Any additional display data associated with tree nodes is preferably later obtained by queries to the analyzer 110, and is preferably not initially included in a tree node display. This may be done in order to minimize the display generation time and also to minimize the amount of data displayed in each tree node. If the user desires more information, the user may query the particular tree node to obtain more. The additional information may be generated by the analyzer 110 on-the-fly and then presented to the user. This will be discussed below.

In operation, the analyzer 110 retrieves data from the repository 105 and generates one or more hyperbolic trees. The display 119 shows one or more hyperbolic trees to the user, including a plurality of nodes and links between nodes. The links are made possible by unique identifiers created and assigned by the analyzer 110 to each tree/node. Nodes and links inside a tree need to be encoded in a format defined by the software viewer that displays the hyperbolic trees in the display 119, for example, the one from Inxight of Sunnyvale, Calif. Such encoding is performed in the analyzer 110 puts this information into a display to be presented to the user.

The analyzer 110 may generate several hyperbolic tree displays, including an interface repository display 122, a dynamic call graph 126, a system characterization report 129, and a linking graph 134.

The interface repository display 122 shows a hyperbolic tree wherein tree nodes contain interface definitions for software components in the application. The interface definitions are structured in a hierarchical manner and may include a set of modules. A module includes a set of interfaces, data types, and exceptions. Each interface further includes a set of function interfaces. Such a hierarchical representation can be described in a tree. By browsing such interface definition related hyperbolic trees, users can understand what services the software components provide and the correct way to request the services. The interface repository display 122 may interact with the repository 105 and may display all interface definitions for a particular system under monitoring.

The dynamic call graph 126 shows a hyperbolic tree wherein tree nodes represent function calls and spawned threads. By inspecting the dynamic call graph 126, the user can observe all actions that result from a function call, including any subsequent function invocations and any threads spawned from the function. The links between nodes show the user the relationships between nodes, so that the user can see which functions call which other functions and can see the threads spawned during the function invocation. Therefore, the dynamic call graph 126 shows dynamic software component interactions. Moreover, the dynamic call graph 126 can display both a function caller/callee relationship and a thread parent/child relationship as links.

Associated with each graph node may be runtime monitoring information such as input/output (I/O) parameters, thrown exceptions, host machine binding of a function or thread, etc. This data is preferably not encoded into a node but may be recalled if the user requests it. The recall may occur when the user clicks on a node menu, for example, with the menu allowing the user to request data that is then recalled from the repository 105.

Note that alternatively all node information may be included in each node. This enables a more immediate display of data, but at the cost of increased memory requirements and increased processing time.

The system characterization report 129 shows a hyperbolic tree wherein tree nodes hold system behavior information such as CPU consumption data for the function invocations. The links between nodes indicate how the CPU consumption is propagated from function callees to the respective function callers, or propagated from the spawned threads to the parent function or parent thread. Consequently, a system-wide CPU usage characterization can be shown in the hyperbolic tree of the system characterization report 129.

The memory utilization may likewise be shown in a hyperbolic tree that is similar to CPU consumption described above. In an alternative embodiment, such memory utilization information may be included as node attributes in the dynamic call graph 126.

Note that the system characterization report 129 in more general circumstance is described as a directed graph. For example, a CPU characterization is a graph which may contain cycles when recursive function invocation occurs in the system. Techniques are known that enable a tree structure to be extracted from such a graph by hiding certain graph edges (links). Such hidden links are also called cross-links. Information can be encoded into the tree structure so that users can realize the existence of these hidden links and request the hidden link information. Unique identifiers associated with the tree nodes facilitate easy encoding of such hidden or cross-linking information.

The linking graph 134 cross-links a particular hyperbolic tree display to another hyperbolic tree. The linking graph 134 shows the links between trees and preferably is dynamically created. The linking graph 134 may be created and/or modified through selection of a menu entry. The menu entry is made possible through the unique node identifiers generated by the analyzer 110 and embedded into each tree node. Therefore, the user may be able to trace and view different aspects of the execution of a particular software component. For example, the dynamic call graph display for a software component A may cause the user to want to see the corresponding CPU consumption hyperbolic tree node. By employing interlinked hyperbolic trees, the user may quickly and easily view multiple pieces of information in order to get a complete picture of the runtime behavior of the software component A.

Nodes in linking graphs inherit the unique identifiers of the original tree nodes assigned by the back-end analyzer 110. Therefore, when the user selects one of the nodes in the linking graph 134, the display 119 may then identify a corresponding node in the destination hyperbolic tree.

Linking graphs may function to bridge different tree nodes between different hyperbolic trees for inter-tree navigation. A linking graph 134 shows the collection of tree nodes $\{N_i\}$ in the destination hyperbolic tree corresponding to a given tree node S in the source hyperbolic tree.

A linking graph can be represented as a simple tree structure with S as the root node and $\{N_i\}$ as the child nodes. This tree structure may be equivalently presented as a simple table if the size of $\{N_i\}$ is small. If the size of $\{N_i\}$ is large, the tree structure can be presented in a hyperbolic tree. In the latter situation, the child nodes $\{N_i\}$ can be transferred into a hierarchical tree structure by employing the system runtime information associated with the nodes. For example, when the child nodes $\{N_i\}$ are the function instance nodes of a dynamic call graph, all of the function instance nodes from the same process may be grouped into one subtree. Those subtrees sharing the same processor may then be further grouped into one bigger subtree.

A subtree of the current node comprises all nodes hierarchically lower than the current node, each of which is a descendant of the current node. In a tree structure, each tree node always contains a subtree. The subtree is empty when the current tree node is a leaf node. In an advantageous feature, a subtree of a currently viewed tree node may be expanded to become completely visible or may be contracted to become completely invisible. This may be done in order to enhance viewing clarity. In addition, the user may click on a currently viewed tree node in order to make it the center node of the current tree display. Therefore, the user may control what data is displayed and, additionally, may control the amount of data presented on the display 119.

In another advantageous feature, the user may move between hyperbolic trees by using the dynamically created linking graph 134. As a result, the display may be scalable so that a very large number of nodes and consequently an even larger amount of runtime information items may be accessed and displayed. In addition, runtime information items may be associated with a group of nodes in a hyperbolic tree. Such a node group can be a path, which in a dynamic call graph represents a particular portion of a function call chain, or a subgraph, which in a dynamic call graph represents a full function call chain. The semantic meaning of path and subgraph may be changed in different hyperbolic trees. This may be done in order to enhance the user's comprehension of all system actions that occur as a result of a particular function invocation. One example of such information may be a path-associated timing latency information, for example. Suppose function A has three child functions, which are denoted as $B_1$, $B_2$, and $B_3$. Function A has latency of 5.0 milliseconds (ms), while the child functions $B_1$, $B_2$, and $B_3$ have latencies of 1.0 ms, 2.5 ms and 1.0 ms, respectively. By displaying this latency information and the function invocation chain, the user may understand how the end-to-end latency is distributed in the system.

Figure 13:
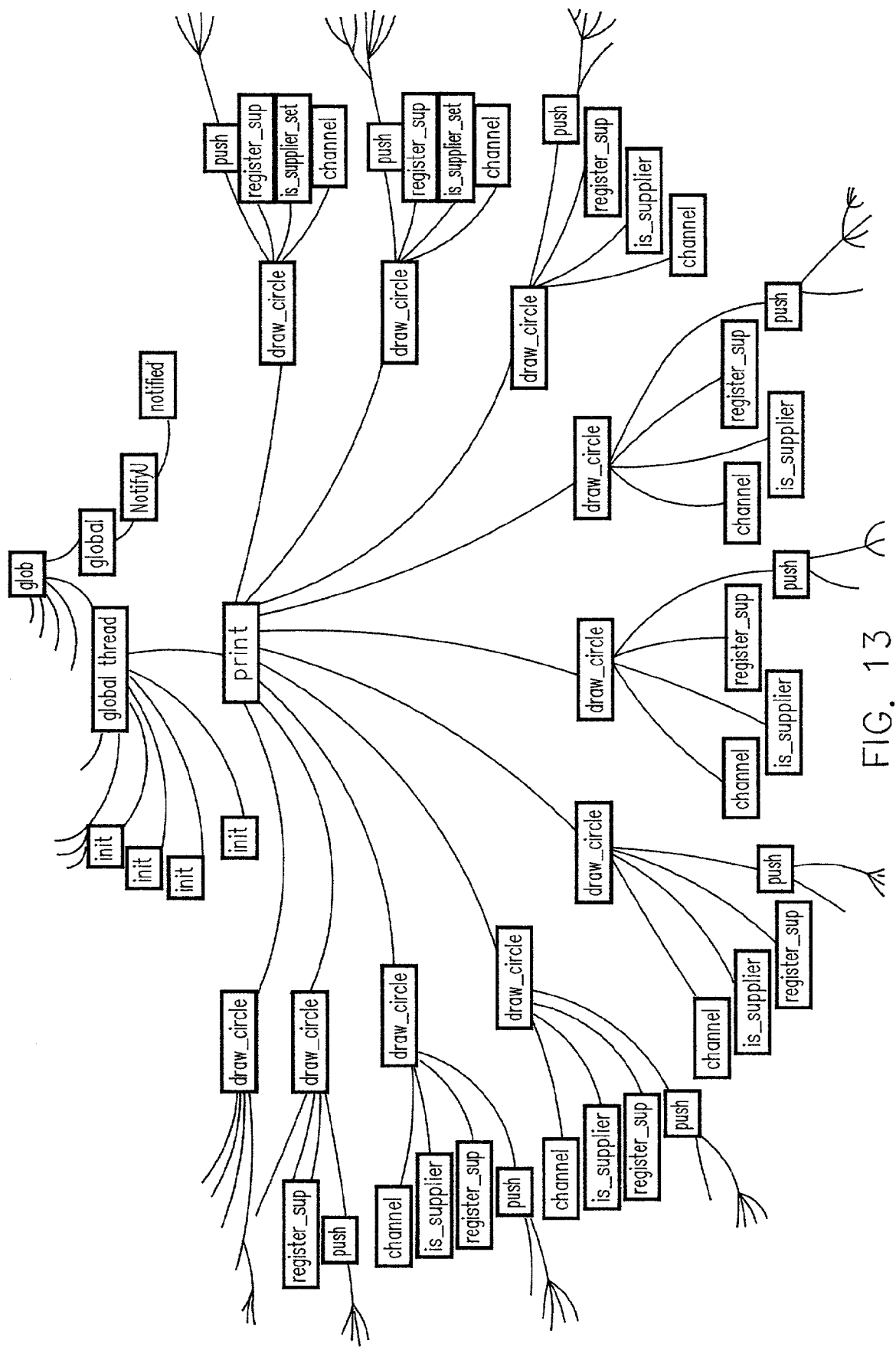
FIG. 13 shows a hyperbolic tree display comprising a plurality of nodes and links between nodes.

FIG. 13 shows a hyperbolic tree display comprising a plurality of nodes and links between nodes for a dynamic call graph from a printing-related component-based application. The hyperbolic tree presents nodes and links in a hyperbolic space and therefore can accommodate and display more information items than a conventional, flat tree display. The hyperbolic tree generally has a center node (here it is a "print" function invocation) and a plurality of hierarchically inferior nodes generally arranged in substantially concentric rings or ring portions around the center node. The outer rings of nodes are progressively reduced in size as the amount of space available to a node decreases quickly as the function of radial separation distance to the center node.

Initially, the main function of the application is located at the center of the display. However, the user can switch his or her focus to another node by selecting it. The hyperbolic tree viewer (like the one from Inxight) will then move the designated node into the center, and the surrounding nodes are correspondingly moved. The switching of focus may be smoothed by certain animated transitions. For a dynamic call graph, as a result of the display being located in hyperbolic space, only several generations of parent functions, sibling functions, and child functions may be displayed in detail. In the hyperbolic tree example shown, the main (print) function has performed numerous other function invocations (directly or indirectly), and therefore has generated numerous other nodes to form the subtree. As the user continuously repositions his or her focus, the new region of call hierarchy will be seamlessly displayed. As the result, the entire call graph may be effectively navigated and inspected.

A hyperbolic tree is capable of displaying nodes in an organized manner that allows users to more readily navigate between nodes. The hyperbolic tree display according to the invention allows quicker and easier navigation than in a planar tree according to the prior art (where a user may not be able to visually see and understand relationships between remote nodes). For example, in a hyperbolic tree dynamic call graph that includes about 15,000 nodes, the software developer can quickly spot inefficiencies in a software component or software application by visually identifying frequent and inefficient function calls during execution. This may include, for example, repeated function calls of the same function. The software developer may spot such an inefficiency after navigating the hyperbolic tree dynamic call graph 126 for only a matter of minutes. In contrast, in a planar display of the prior art, the developer or user may need to spend a much larger amount of time in order to navigate among the information points and visually comprehend the information.

Figure 14:
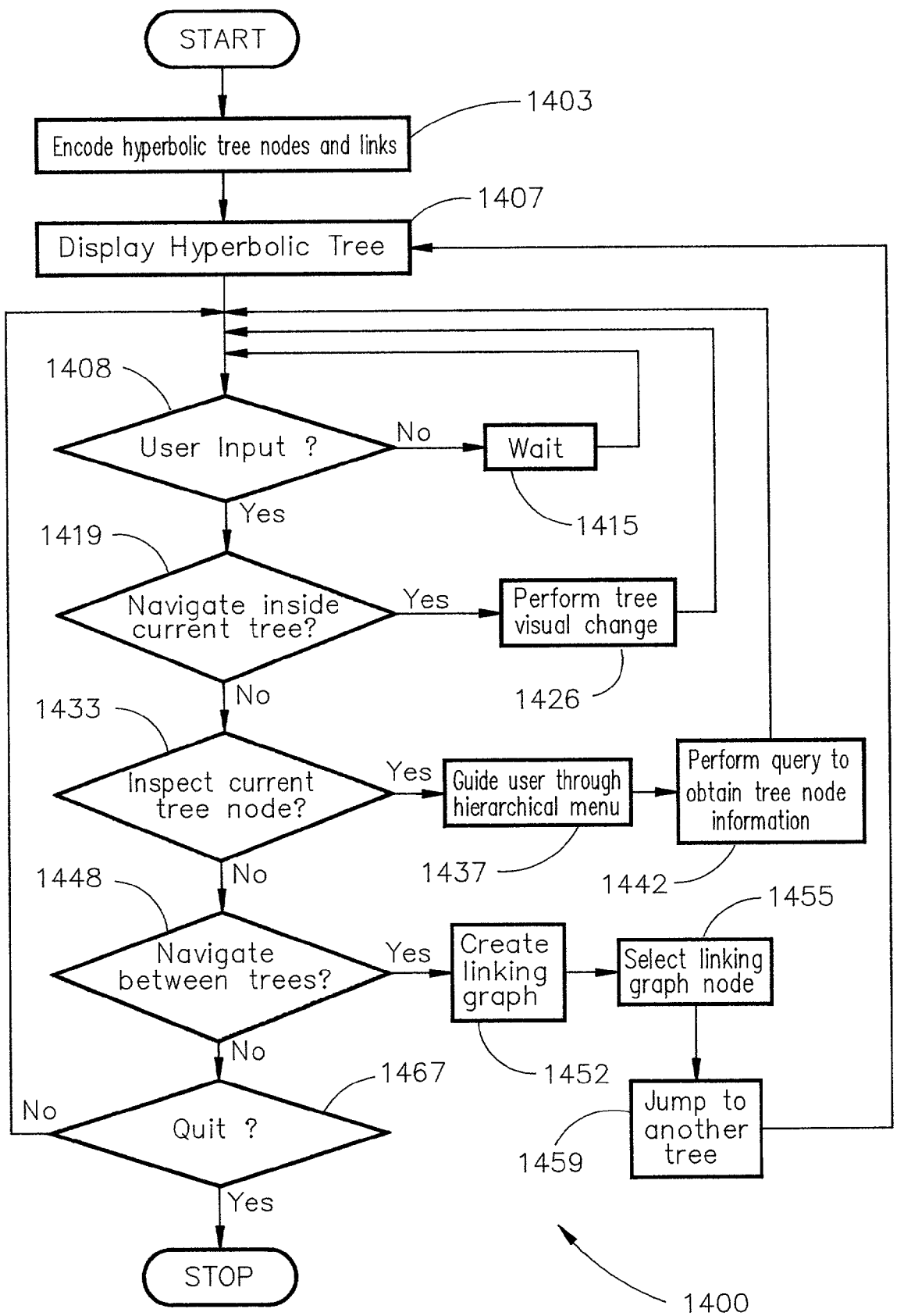
FIG. 14 is a flowchart of a method for displaying a computer system runtime information according to another embodiment of the invention.

FIG. 14 is a flowchart 1400 of a method for displaying computer system runtime information according to another embodiment of the invention. In step 1403, the analyzer 110 encodes runtime monitoring information into a file in a format that is recognized by the display 119. This includes encoding the hyperbolic tree nodes and links to be displayed. The runtime monitoring information may be obtained from one or more storages, such as the central repository 105.

In step 1407, the display 119 picks up the file or files (which have hyperbolic tree data encoded inside them) and displays them to the user via the display 119.

In step 1408, the method determines whether a user input has occurred. If no user input has occurred, the method proceeds to step 1415 and waits for user input. This step is performed because the display 119 does not change until a user input has been received. If the user input has been received, the method proceeds to step 1419.

In step 1419, the method determines whether the user input is a command to navigate inside a current tree. If it is, the method proceeds to step 1426; otherwise, it proceeds to step 1433.

In step 1426, the user has elected to navigate inside a currently displayed hyperbolic tree. Consequently, the method moves the user-selected node to the center node of the hyperbolic tree and correspondingly adjusts the displayed nodes and links (i.e., all nodes and links adjacent to the new center node are now brought into focus). In addition, subtrees of the newly selected center node and the previous center node may be correspondingly expanded and contracted. These steps may be performed in order to improve visual clarity, such as when a graph includes upwards of tens of thousands of nodes, or in order to improve the visualization system's performance, e.g., when a subtree is contracted, the associated memory can be released by the display 119. Subsequently, the subtree may be dynamically constructed by the analyzer 115 and loaded into the display 119 if expansion is requested by the user.

In step 1433, the method determines whether the user command is to inspect a current tree node. If yes, the method branches to steps 1437 and 1442; otherwise, it proceeds to step 1448.

In step 1437, the user has elected to inspect a current tree node. Therefore, the display guides the user through a hierarchical menu that presents display options to the user. The user may select one of these displayed menu options (see FIG. 16 and accompanying text below). Through such a menu, the user may elect to display a variety of information for the particular node, such as CPU consumption, timing latency, and memory usage. It should be understood that because of the construction of the dynamic call graph, the user can determine causality relationships by inspecting the nodes and the relationships between nodes.

In step 1442, the display 119 takes the user input and performs a query to the analyzer 110 in order to obtain the desired additional tree node information. When the tree node information is received in the display 119, it is presented to the user.

In step 1448, if the user command is an input to navigate between trees, the method branches to steps 1452, 1455 and 1459; otherwise, the method proceeds to step 1467.

In step 1452, the user has elected to navigate to another hyperbolic tree. Consequently, the display 119 transmits this user input to the analyzer 110, which dynamically creates a linking graph 134 that links the currently displayed hyperbolic tree to the desired hyperbolic tree. The analyzer 110 sends the linking graph 134 to the display 119.

In step 1455, the user selects a linking graph node that represents the hyperbolic tree where the user wishes to move.

In step 1459, the display 119 jumps to the selected node in the selected tree. It is likely that the selected node is hidden in a contracted subtree. If this is the case, the display 109 has to expand the subtree. The display 109 might further interact with the analyzer 110 if the subtree needs to be dynamically generated. Subsequently, the display 109 may elect the selected node as the new node of focus so that when step 1407 is reached, the selected node will be positioned at the center.

In step 1467, the method determines whether user input is a quit command. If not, the method branches back to step 1408 and waits for user input; otherwise, the display method terminates.

Figure 15:
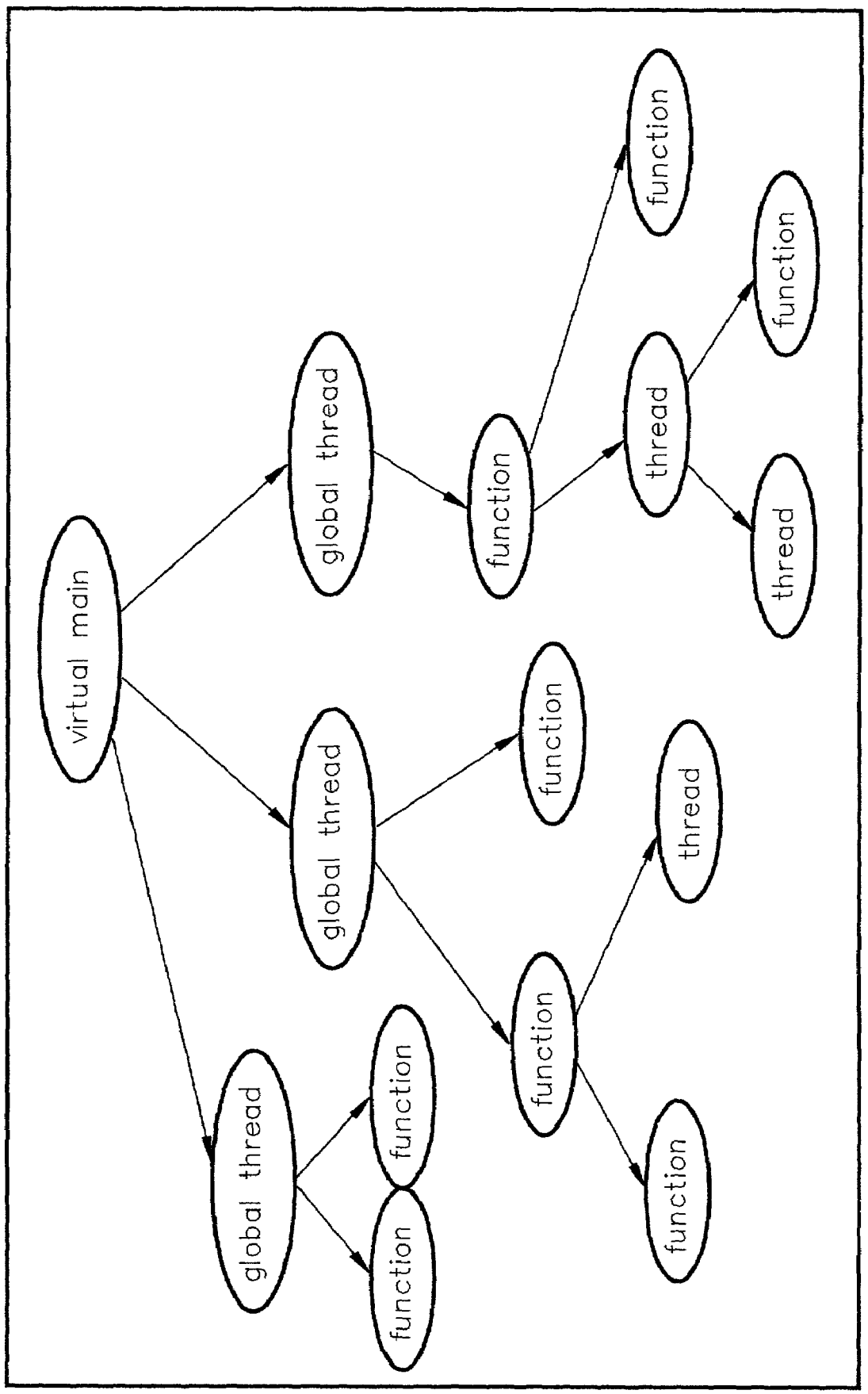
FIG. 15 is a tree that shows some of the different node types that exist in a dynamic call graph, and their compositional relationships.

FIG. 15 is a tree that shows some of the different node types that exist in a dynamic call graph, and their compositional relationship. The "virtual main" function (i.e., the topmost node) is a unique node. The purpose of creating such a node is to guarantee that the dynamic call graph is a single tree. In a traditional sequential software program, the main function call is always invoked first. However, in a distributed and multithreaded software system, different processes can start their own independent thread of control, which leads to different independent tree representations. If such a situation occurs, the "virtual main" merges the independent trees into one single tree. The top node is linked to one or more sets of hierarchically inferior global thread nodes, each of which corresponds to the occurrence of an independent thread of control in the system.

A Global Thread node represents the start of a sequence of function invocations across the computer system (such as in a component-based software system). In the dynamic call graph, a Global Thread node represents an independent thread of control in the system. The Global Thread may span threads, processes and processors. Therefore, the virtual main function invocation in the example shows three separate Global Thread nodes, each of which is an independent thread of control over a particular system run.

Each Global Thread will have a set of child nodes, each of which is a Function Instance node, that represents a function invocation instance sharing the same Global Causal ID. A Function Instance node may be a leaf of the graph, or it may further link to sub-nodes, each of which can be a Function Instance node representing the child function of this function. Alternatively, an Function Instance node may further link to sub-nodes that are Thread nodes, each of which represent a thread spawned from the Function Instance node. Moreover, a Thread node can further link to one or more child Thread nodes, each of which represents a spawned thread, and possibly link to one or more Function Instance nodes. Such composition relationship can be recursively applied to form a complex tree structure.

Figure 16:
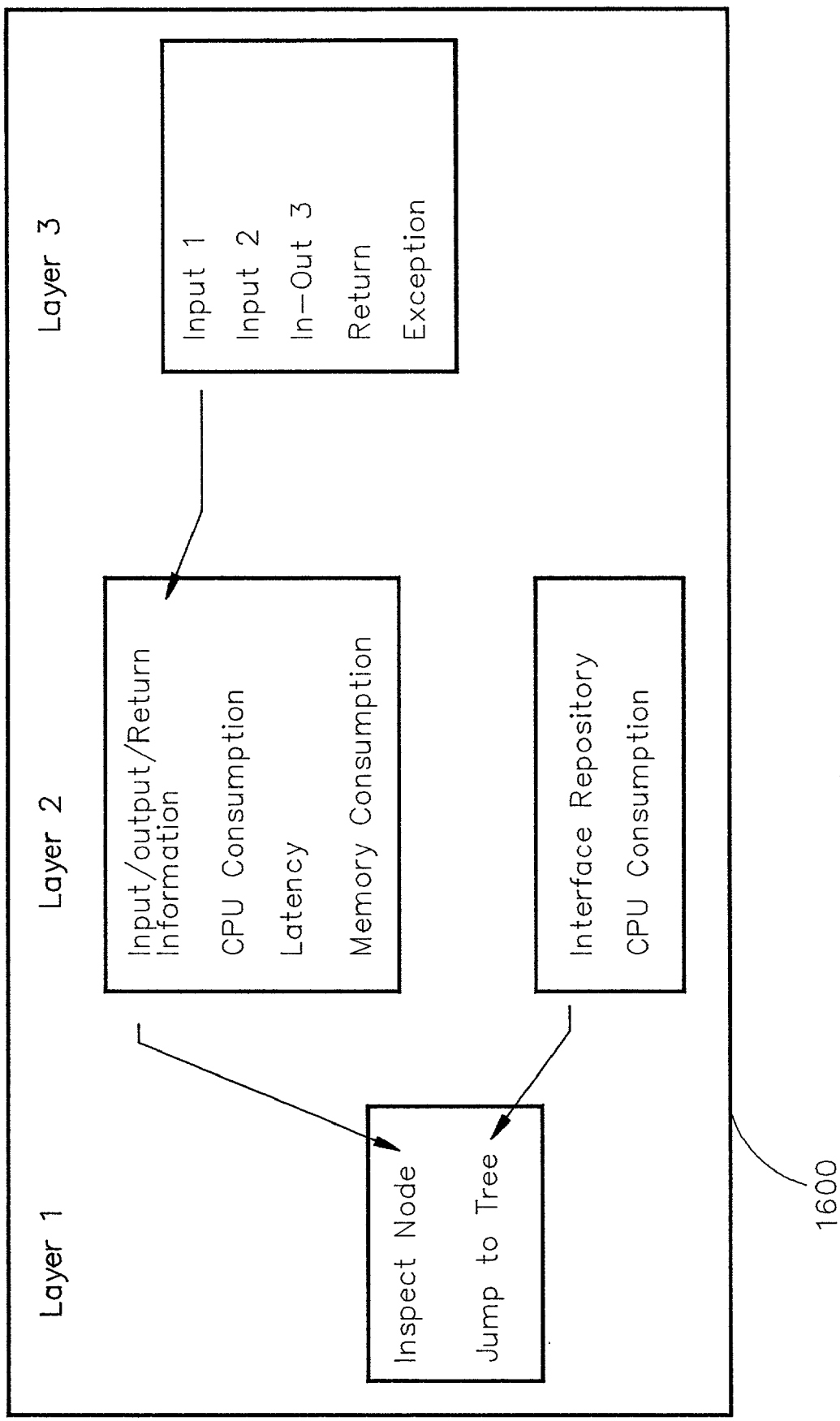
FIG. 16 is a hyperbolic tree node menu.

FIG. 16 is a hyperbolic tree node menu 1600 according to one embodiment of the invention. The menu 1600 may include multiple entries and optionally may be organized into multiple layers, as shown. The user menu 1600 may be hierarchically structured as shown in the figure in order to provide intra-tree inspection and inter-tree navigation capabilities. The information associated with a tree node may be organized and presented through such a menu 1600, with the menu 1600 allowing the user to request additional node information or to move between hyperbolic trees.

There may be at least two types of commands in the user menu. The commands are shown in layer 1 of the menu 1600. The first type of command is the tree node information associated command (i.e., "inspect node") that shows information associated with a currently selected tree node. The tree node information associated command may be used to query additional runtime information items.

The runtime information items available through a particular menu may be dependent on the type of runtime information that a current tree node is displaying. For example, in a dynamic call graph node, the associated menu may allow a user to query function call and return data, timing latency data, CPU consumption data, and memory consumption data. In contrast, in an interface repository tree node, an associated menu may not necessarily contain such detailed information, and the user may first have to move to another hyperbolic tree in order to obtain access to the desired runtime information. However, function interface nodes in an interface repository tree can be annotated with statistical behavior information relevant to the implementation of the function interface, including time latency and CPU and memory consumption data. Therefore, if the user wants to see the overall behavior of a function, the user may move to the interface repository tree and inspect the behavior information attached to the interface node.

The figure shows a menu associated with a dynamic call graph node. Because of the construction of the dynamic call graph, the user can determine causality relationships by inspecting the nodes and the relationships between nodes (i.e., the links). Therefore, the dynamic call graph node menu does not need to include any causality relationship data.

In the menu example shown, the CPU consumption menu entry may allow the user to determine how much CPU processing time was consumed for this particular function invocation. Likewise, the memory consumption menu entry may allow the user to determine how much memory was used. The Input/output/return information menu entry allows the user to obtain input, output, and return information, and the (timing) latency menu entry allows the user to obtain a timing latency information.

The tree node information associated command may additionally operate for a set of tree nodes. Therefore, the tree node information associated command may be path-associated or subgraph-associated.

A tree node information associated command that is path-associated requires the user to select a tree node as a path start node and another tree node as a path end node. As a result, all nodes between the two are part of a query. For example, a path-associated CPU consumption information may be selected in order to display a CPU consumption of each individual function, as well as how the CPU consumption time is accumulated along the selected path. Likewise, a path-associated timing latency information may be selected in order to display how the timing latency is distributed along the selected path.

A tree node information associated command that is subgraph-associated only requires the user to select the top subgraph node. Consequently, the runtime information for that node and all hierarchically lower nodes is automatically displayed. For example, a subgraph-associated CPU consumption and a subgraph-associated timing latency information may be selected in order to comprehend how the CPU consumption and the timing latency are distributed over the current node and all its descendant nodes. Therefore, using one of these tree node information associated commands, the user can determine whether a particular function invocation is being relatively inefficient by consuming excessive time and resources.

The second type of command is an inter-tree navigation associated command (i.e., "jump to tree") that may be used to jump to another hyperbolic tree. For example, the inter-tree navigation associated command may be used to go from a dynamic call graph hyperbolic tree to a CPU consumption hyperbolic tree.

The information presented upon selection of the inter-tree navigation associated command depends on both the current hyperbolic tree and the current tree node. For example, for the current dynamic call graph tree node, the navigation command options may include moving to the interface repository tree and moving to the CPU/memory consumption characterization tree.

A virtual main node in a dynamic call graph will preferably not include any inter-tree navigation capability. However, the main node may include some logging information for conducting monitoring experiments, such as a system starting time that may be used to distinguish different system runs.

Compact information such as host name, process identifier, and interface names may be directly encoded into the tree format data. Therefore, the compact information does not need to be obtained through the menu 1600 and may be directly displayed in a tree node (such as the process identifier, for example). Alternatively, the compact information may be displayed at the bottom of a web browser when the user positions a cursor over a particular tree node as provided by the Inxight's hyperbole tree viewer, for example.

Figure 17:
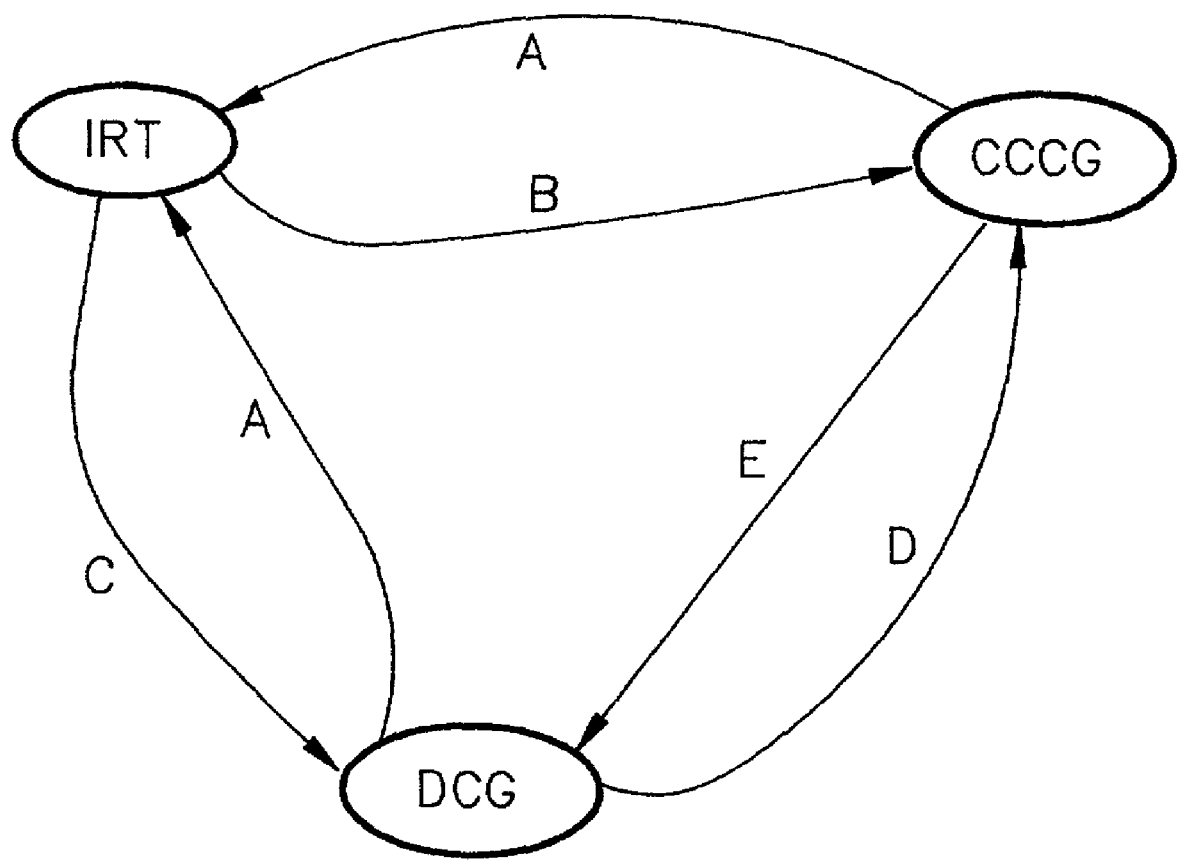
FIG. 17 is a state-transition diagram that shows possible scenarios for a switch between different hyperbolic trees.

FIG. 17 is a state-transition diagram that shows possible scenarios for a switch between different hyperbolic trees in order to obtain a comprehensive system behavior information (without being overwhelmed by the enormous amount of raw monitoring data and post processing data). In the node transition A, the user has chosen to transition from either the dynamic call graph (DCG) or the CPU consumption characterization graph (CCCG) to the interface repository tree (IRT). These two node transitions may be chosen in order to inspect the function interface definition corresponding to a component-level function invocation, or to inspect the statistical CPU/memory usage of the component-based function invocations associated with the interface.

In the node transition B, the user has chosen to transition from the IRT to the CCCG. This node transition may be chosen in order to see how CPU consumption and its propagation behaves in the actual system implementation.

In the node transition C, the user has chosen to transition from the IRT to the DCG. This node transition may be chosen in order to see how the function invocations are carried out and how each invocation is propagated.

In the node transition D, the user has chosen to transition from the DCG to the CCCG. This node transition may be chosen in order to see the resulting CPU consumption, given the actual component interaction via a component-level function invocation.

In the node transition E, the user has chosen to transition from the CCCG to the DCG. This node transition may be chosen in order to see the resulting causality propagation in terms of function invocation and thread spawning.

Figure 18:
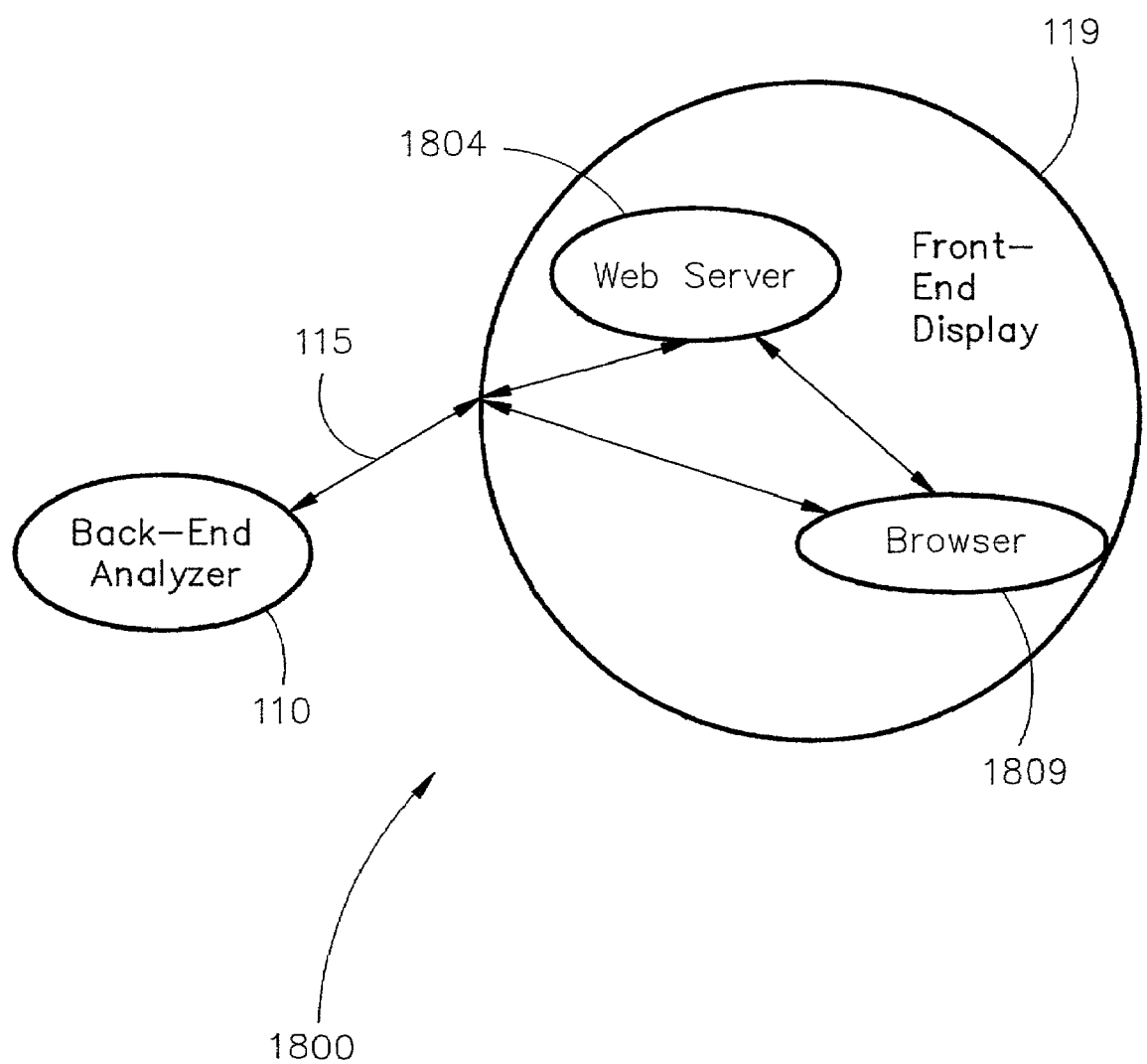
FIG. 18 shows a world-wide-web-based visualization system according to another embodiment of the invention.

FIG. 18 shows a world-wide-web-based visualization system 1800 according to another embodiment of the invention (the components in common with FIG. 12 share reference numerals). In this embodiment, the display 119 comprises a web server 1804 and a web browser 1809. The web browser 1809 may be any type of available web browser such as INTERNET EXPLORER, NETSCAPE NAVIGATOR, etc.

The analyzer 110 provides encoded tree data in a format recognized by the hyperbolic tree viewer, upon a request from the web server 1804. The tree data is stored in some manner of storage or file system and is retrievable by the web server 1804. When the user invokes a HTML page stored in the web server 1804, the web browser 1809 displays a hyperbolic tree by loading a specific Java applet stored in the web server 1804. The Java applet works as a hyperbolic tree viewer that loads the tree data from the web server 1804 and displays the tree on the web browser 1809.

A browser may be defined as a software application used to locate and display Internet web pages. The browser window may include an applet, such as a JAVA applet, that loads the hyperbolic tree encoded data. An applet may be defined as a software program designed to be executed from within another software application. However, unlike most software applications, applets cannot be executed directly from the operating system. Web browsers can interpret applets from web servers. Because applets are small in size, are cross-platform compatible, and are highly secure (i.e., they cannot be used to access a user's local hard drive), they are commonly used for small Internet applications that are accessible from a browser.

In operation, the user can query the tree node information by invoking a desired command from a menu associated with the JAVA applet. The command may be directly communicated to the analyzer 110. The query result is displayed back to the browser 1809. Such query mechanism can be used for querying individual items of tree node information.

In a more complex interaction, the query can first go to the web server 1804 through a common gateway interface (CGI) technique, such as by employing a JAVA serverlet. In response, the web server 1804 forwards the command to the back-end analyzer 110. The query result will come back from the analyzer 110 to the web server 1804 and will be displayed in the browser 1809 in a dynamically generated HTML page. The query mechanism therefore can be used to generate the linking graph 134.

The display system and method may be applied to any computer system that gathers and displays runtime system behavior, including multi-threaded and multi-processored computer systems. In addition, the invention may be applied to component-based software applications running on a component-based computer system. The component-based computer system may be a computer network where multiple processors may be called upon in order to accomplish a task.

The invention differs from the prior art in several ways. The invention uses multiple coordinated and linked hyperbolic trees. Hyperbolic trees enable the display of a large number of information items. The invention efficiently displays computer system runtime behavior, including behavior of multi-threaded software applications running in a multi-processor environment.

Unlike the prior art, the invention is not limited to using planar displays and instead uses advanced graphical visualization techniques to visualize the system behavior. In contrast to the invention, the prior art is not capable of displaying causality relationships, including function caller/ callee relationships and thread parent/child relationships. The prior art does not generally display timing latency results for a multi-processored system or for a system capable of running multi-threaded software applications. Moreover, the prior art is not capable of displaying CPU and memory consumption on such a multi-threaded and multi-processored environment. Furthermore, the prior art is not able to display the runtime system identifiers associated with function invocations and spawned threads, which includes, for example thread identifiers, running process identifiers, and host names. Moreover, the prior art is not able to correlate such runtime system identifiers in a chaining fashion to show how an initial function invocation propagates its computing activity (including subsequent function invocations and thread spawning) throughout the entire computer system.

The invention provides several benefits. The invention provides display of a large number of runtime information items. The invention provides multiple views and multi-dimensional views of the underlying system behavior. The invention enables the user to understand the dynamic behavior of large scale distributed software applications. Moreover, the invention enables the user to understand a complex, multi-threaded, multi-processor distributed software application while yet providing easy navigation among data items.

The invention provides a seamless navigation between different types of data and between different data displays. The invention provides inter-linked displays wherein the user can examine several different aspects of a particular function invocation and return. Moreover, the invention provides a display capability over a computer network and even over the Internet, wherein the user can remotely examine data from another system, and share data with others collaboratively through the internet.

The invention provides dynamic generations of display and therefore reduces storage and processing requirements. As a part of this on-the-fly processing capability, the cross-linking operations associated with the linking graph 134 can be performed by the analyzer 110. By using the unique identifiers assigned by the analyzer 110, cross-links from a node in one tree to the respective nodes in another tree can be tracked and may be shown in tabular form or in a hyperbolic tree. The contractable/expandable subtrees may be dynamically generated when they are requested by the user.

We claim:

1. A method for displaying computer system runtime information, comprising the steps of:
    displaying a plurality of runtime information items in a first hyperbolic tree as a plurality of first nodes;
    assigning a unique identifier for each of said plurality of first nodes displayed in said first hyperbolic tree;
    showing one or more links between first nodes in said first hyperbolic tree, with said one or more links representing node causal relationships;
    moving a particular one of said first nodes of said first hyperbolic tree to a center node position in said first hyperbolic tree upon a user input selecting said particular first node; and
    generating a second hyperbolic tree that includes a plurality of second nodes;
    assigning a unique identifier for each of said plurality of second nodes;
    generating a linking graph as a third hyperbolic tree that links said first hyperbolic tree and said second hyperbolic tree, said third hyperbolic tree includes a plurality of third nodes, said step of generating includes,
        at least one of said third nodes inheriting the unique identifier assigned to one of said first nodes in said first hyperbolic tree to correspond with the one first node;
        at least another one of the third nodes inheriting the unique identifier assigned to one of the second nodes in the second hyperbolic tree to correspond with the one second node; and
        generating the third hyperbolic tree to show a link between the at least one third node and the at least another third node, with link representing a node causal relationship based on the inherited unique identifiers to link the first hyperbolic tree with the second hyperbolic tree.

2. The method of claim 1, wherein the displaying step dynamically generates said first hyperbolic tree.

3. The method of claim 1, further comprising: displaying the node causal relationships and the runtime information items in a non-tree graph.

4. The method of claim 1, wherein:
    the plurality of first nodes in the first hyperbolic tree contain interface definitions for components in an application; and
    the plurality of second nodes in the second hyperbolic tree represent function calls and threads spawned from at least one of the function calls.

5. The method of claim 1, wherein the step of generating a linking graph that links said first hyperbolic tree and the second hyperbolic tree comprises:
    generating the linking graph as the third hyperbolic tree upon a user input being a navigation input that selects said second hyperbolic tree.

6. The method of claim 1, wherein the step of generating said linking graph further comprises dynamically generating said linking graph.

7. The method of claim 1, further comprising the step of moving into focus a selected one of the second nodes from the second hyperbolic tree, wherein said selected node was in a contracted subtree.

8. A method for displaying computer system runtime information on an electronic display device, comprising the steps of:
    displaying on the electronic display device a plurality of runtime information items in a first hyperbolic tree as a plurality of nodes;
    showing on the electronic display device one or more links between nodes in said first hyperbolic tree, with said one or more links representing node causal relationships;
    the electronic display device automatically moving a particular tree node of said first hyperbolic tree to a center node position in said first hyperbolic tree in the displaying of the first hyperbolic tree upon receiving a user input selection of said particular tree node; and
    in response to a user input being a navigation input that selects another hyperbolic tree, generating a linking graph for displaying on the electronic display device as a third hyperbolic tree that links said first hyperbolic tree and a second hyperbolic tree, wherein the third hyperbolic tree includes at least one node that is external to the first hyperbolic tree and the second hyperbolic tree includes the at least one node of the third hyperbolic tree.

9. The method of claim 8, wherein the displaying step dynamically generates said first hyperbolic tree, and the method further comprises displaying the node causal relationships and the runtime information items in a non-tree graph.

10. The method of claim 8, wherein a user input to a displayed hyperbolic tree is capable of expanding or contracting said displayed hyperbolic tree.

11. The method of claim 8, further comprising:
enabling a display of the second hyperbolic tree on the electronic display device in response to a user input being a navigation input to the linking graph that selects the second hyperbolic tree; and
enabling a display of the first hyperbolic tree on the electronic display device again in response to a user input being a navigation input the linking graph that selects the first hyperbolic tree.

12. A visualization system adapted for displaying runtime information from a computer system, comprising:
a repository for storing a plurality of runtime information items from said computer system;
a display device capable of displaying one or more runtime information items of said plurality of runtime information items; and
an analyzer for retrieving said one or more runtime information items from said plurality of runtime information items, processing said one or more runtime information items, and generating a display of said one or more runtime information items on said display device;
wherein said display device displays said runtime information as at least two hyperbolic trees, each having a plurality of tree nodes;
wherein said analyzer is operable to assign a unique identifier for each of the tree nodes in said at least two hyperbolic trees, and wherein said unique identifier is used for cross-linking between one of the plurality of nodes in a first one of said at least two hyperbolic trees and one of the plurality of nodes in a second one of said at least two hyperbolic trees to generate a third hyperbolic tree representing a linking graph based on the first and second hyperbolic trees.

13. The system of claim 12, wherein said display device communicates with said analyzer over a second communication link.

14. The system of claim 12, wherein said repository communicates with said analyzer over a first communication link.

15. The system of claim 12, wherein said at least two hyperbolic trees comprises an interface repository hyperbolic tree.

16. The system of claim 12, wherein the first hyperbolic tree comprises a dynamic call graph hyperbolic tree with the plurality of nodes therein representing function calls and threads spawned from at least one of the function calls, and the second hyperbolic tree comprises a system characterization report with the plurality of nodes therein representing behavior information of the system.

17. The system of claim 12, wherein said at least two hyperbolic trees represent different aspects of a system characterization.

18. The system of claim 12, wherein said analyzer assigns a unique identifier for each displayed hyperbolic tree node, and wherein said unique identifier is used for cross-linking between tree nodes in a hyperbolic tree.

19. The system of claim 12, wherein said display moves into focus a selected node from a second hyperbolic tree, wherein said selected node was in a contracted subtree.

20. The system of claim 12, wherein a tree-specific, node-oriented menu is provided for the user to inspect a node information, a path information, and a subgraph-associated system information.

21. The system of claim 12, wherein said display device is capable of being launched and operated inside a web browser and wherein said display device interacts directly with said analyzer or through a web server.

* * * * *